(12) United States Patent
Walker et al.

(10) Patent No.: US 10,683,372 B2
(45) Date of Patent: *Jun. 16, 2020

(54) EFFICIENT COPOLYMERS HAVING AN AGGLOMERATING EFFECT

(71) Applicant: INEOS STYROLUTION GROUP GMBH, Frankfurt am Main (DE)

(72) Inventors: Roland Walker, Osnabrueck (DE); Gisbert Michels, Leverkusen (DE); Brian J. Banaszak, Mannheim (DE); Norbert Niessner, Friedelsheim (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 35 days.

This patent is subject to a terminal disclaimer.

(21) Appl. No.: 15/554,268

(22) PCT Filed: Mar. 3, 2016

(86) PCT No.: PCT/EP2016/054549
§ 371 (c)(1),
(2) Date: Aug. 29, 2017

(87) PCT Pub. No.: WO2016/139307
PCT Pub. Date: Sep. 9, 2016

(65) Prior Publication Data
US 2018/0044443 A1    Feb. 15, 2018

(30) Foreign Application Priority Data

Mar. 5, 2015   (EP) .................................... 15157854
Jun. 12, 2015  (EP) .................................... 15171978

(51) Int. Cl.
| | | |
|---|---|---|
| *C08F 2/24* | (2006.01) | |
| *C08F 265/04* | (2006.01) | |
| *C08F 297/02* | (2006.01) | |
| *C09D 151/00* | (2006.01) | |
| *C08L 25/12* | (2006.01) | |
| *C08L 51/00* | (2006.01) | |
| *C08F 212/08* | (2006.01) | |
| *C08F 220/44* | (2006.01) | |

(52) U.S. Cl.
CPC .............. *C08F 2/24* (2013.01); *C08F 212/08* (2013.01); *C08F 220/44* (2013.01); *C08F 265/04* (2013.01); *C08F 297/02* (2013.01); *C08L 25/12* (2013.01); *C08L 51/003* (2013.01); *C09D 151/003* (2013.01); *C08L 2207/53* (2013.01)

(58) Field of Classification Search
CPC ..................................................... B32B 27/36; B32B 7/02; B32B 27/08; B32B 2307/416; B32B 2307/518; B32B 2457/208; B32B 2270/00; Y10T 428/24983; Y10T 428/31794

See application file for complete search history.

(56) References Cited

U.S. PATENT DOCUMENTS

| | | | | |
|---|---|---|---|---|
| 4,421,875 A | * | 12/1983 | McKee et al. ......... | C08F 265/04 523/335 |
| 5,312,575 A | * | 5/1994 | Wills .................... | C08F 285/00 264/109 |
| 5,373,060 A | | 12/1994 | Guentherberg et al. | |
| 5,955,540 A | * | 9/1999 | Dion et al. ............. | C08F 279/02 525/71 |
| 9,624,333 B2 | * | 4/2017 | Niessner et al. ........... | C08F 2/26 |
| 9,708,483 B2 | * | 7/2017 | Niessner et al. ....... | C08F 265/04 |
| 2013/0302582 A1 | * | 11/2013 | Matsunaga et al. .... | B32B 27/36 428/217 |
| 2016/0083572 A1 | | 3/2016 | Niessner et al. | |

FOREIGN PATENT DOCUMENTS

| | | |
|---|---|---|
| CA | 1056975 A | 6/1979 |
| DE | 2427960 B1 | 6/1975 |
| DE | 102005022632 A1 | 11/2006 |
| DE | 102005022635 A1 | 11/2006 |
| EP | 0062901 A2 | 10/1982 |
| EP | 0579140 A2 | 1/1994 |
| WO | 2014/170407 A1 | 10/2014 |
| WO | 2015/165810 A1 | 11/2015 |

OTHER PUBLICATIONS

English translation of International Preliminary Report on Patentability in International Application No. PCT/EP2016/054549, dated Sep. 8, 2017.

* cited by examiner

*Primary Examiner* — Nathan M Nutter

(74) *Attorney, Agent, or Firm* — J.A. Lindeman & Co. PLLC

(57) ABSTRACT

The invention relates to graft copolymers (B) composed of an agglomerated graft core (B1) and at least one graft shell (B2) and also to copolymers (C) having an agglomerating effect, a method for producing said graft copolymers (B), thermoplastic molding compositions and also the use of the thermoplastic molding compositions.

10 Claims, 5 Drawing Sheets

EFFICIENT COPOLYMERS HAVING AN AGGLOMERATING EFFECT

Figure 1:
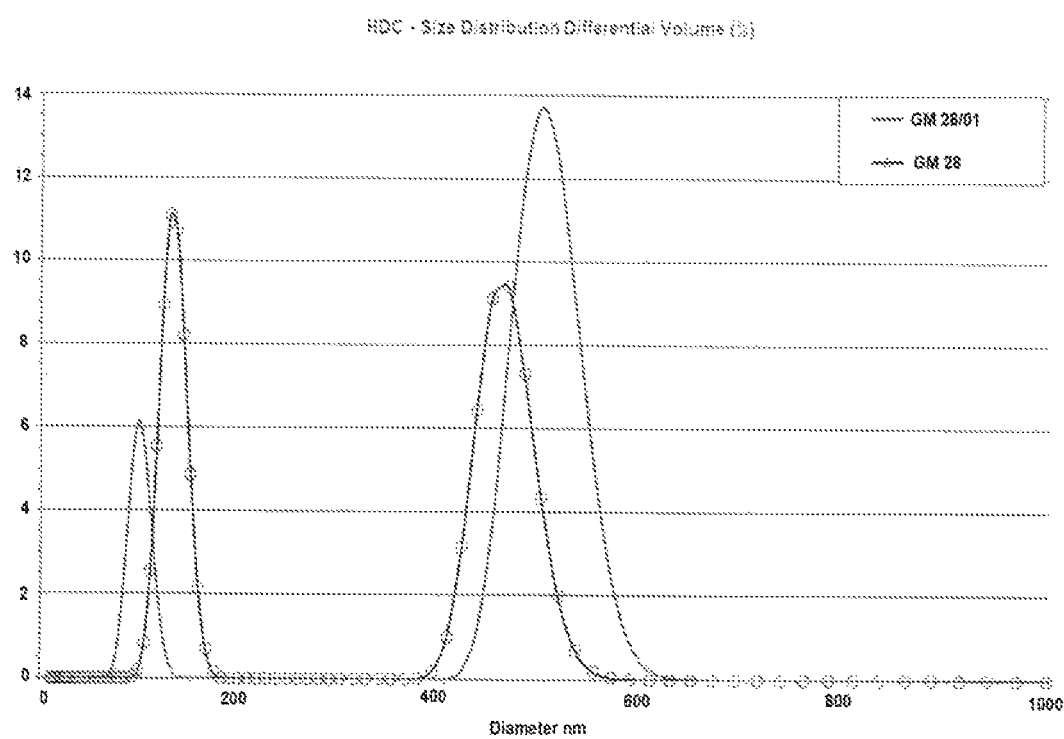

The invention relates to graft copolymers (B) composed of an agglomerated graft core (B1) and at least one graft shell (B2). The invention further relates to copolymers (C) having an agglomerating effect, a process for producing the graft copolymers (B) according to the invention, to thermoplastic molding compositions and also to the use of the thermoplastic molding compositions according to the invention.

Rubber latices, as are obtained in a customary homo- or copolymerization of butadiene for example, generally comprise graft (co)polymer particles having an average particle diameter in the order of magnitude of about 0.05 to 0.6 µm. ABS polymers prepared using such rubbers generally exhibit low toughness. It is known that acrylonitrile-butadiene-styrene copolymers with more favorable properties can be obtained by using rubber latices with larger particles in the graft polymerization for the preparation of the ABS polymers. It is also known that the particles of a rubber produced in emulsion or emulsified after its preparation can be increased (agglomeration) by addition of a second suitable rubber dispersion.

H.-G. Keppler (Angew. Makromol. Chem. 2, 1968, pages 1 to 25) describes an investigation of the agglomeration of polymer latices. In the experiments carried out as examples, a polybutadiene rubber is used as the substrate "S" and a copolymer of butadiene, styrene and methacrylic acid as agglomerating agent "A". According to Keppler, bimodal distributions are generally obtained in the agglomeration of the rubber latices. A maximum of the differential distribution function in the case of small particle diameters comprises the portion of the primary particles which have not been agglomerated. A second maximum comprises the secondary particles formed by agglomeration of the primary particles. Further, Keppler mentions that the distribution of the secondary particles is typically "often quite narrow". With respect to control of the particle size distribution within the individual fractions of the agglomerated rubber latex, Keppler makes no statement.

DE 10 2005 022 632 describes a particulate agglomeration latex, a polybutadiene rubber dispersion agglomerated therewith and a corresponding SAN graft rubber, and a thermoplastic molding composition made of SAN comprising the graft rubber. A copolymer of ethyl acrylate and methacrylamide is preferably used as agglomeration latex. The agglomeration latex particularly preferably has a non-uniformity U of ≤0.35 and a $d_{50}$ value of 65 to 150 nm. Furthermore, particulate rubbers produced with the aid of the agglomeration latex are described having a bimodal particle size distribution comprising non-agglomerated particles and a fraction of agglomerated particles. The fraction of agglomerated particles preferably has a non-uniformity U of ≤0.7 and particularly preferably a $d_{50}$ value of >400 nm.

DE 10 2005 022 635 describes an agglomeration latex, in particular a copolymer of ethyl acrylate and methacrylamide, having a non-uniformity U of ≤0.35 and a $d_{50}$ value of 80 to 190 nm. An emulsion rubber agglomerated therewith has at least one fraction of agglomerated particles having a non-uniformity U of <0.35, particularly preferably <0.30, and a $d_{50}$ value of >300 nm, preferably >400 nm. Further, a polybutadiene rubber having a SAN graft layer comprising an agglomerated rubber fraction having a non-uniformity of 0.33 and a $d_{50}$ value of 630 nm is described, and also a thermoplastic molding composition comprising the same.

EP-A 0 579 140 describes a particulate graft polymer A composed of:
A1: a graft core based on a polydiene rubber A1 composed of, based on A1,
A11: 70 to 100% by weight of a polymerizable diene and
A12: up to 30% by weight of a copolymerizable, ethylenically unsaturated monomer having a first graft shell A2 composed of, based on A2,
A21: 75 to 99.8% by weight of at least one $C_1$-$C_8$-alkyl acrylate A21,
A22: 0.1 to 5% by weight of at least one polyfunctional crosslinking monomer A22,
A23: 0.1 to 20% by weight of at least one monomer A23 comprising one or more acidic or basic groups, and a second graft shell A3 consisting of, based on A3
A31: 40 to 89.9% by weight of at least one vinylaromatic monomer A31,
A32: 10 to 49.9% by weight of at least one polar ethylenically unsaturated monomer A32,
A33: 0.1 to 20% by weight of at least one monomer A33 comprising one or more basic or acidic groups and
A34: up to 5% by weight of at least one polyfunctional crosslinking monomer A34, where A23 and A33 in each case signify different groups.

The mechanical properties, such as Charpy notch impact strength but also optical properties such as the surface gloss, of the molding compositions or moldings produced according to the aforementioned state of the art with styrene-acrylonitrile copolymers are still in need of improvement.

An object of the present invention is to provide a copolymer having an agglomerating effect and an agglomeration latex composition having improved physical properties in order to ensure the highest possible agglomeration yield in the preparation of the copolymers. In addition, molding compositions containing agglomeration latex compositions are to be provided.

The object is achieved by a graft copolymer (B), composed of:
(B1): an agglomerated graft core (B1), obtainable (or obtained) by:
  (a) polymerizing at least one ethylenically unsaturated monomer (B10) to give a graft core (B1a), and
  (b) agglomeration of the graft core (B1a) obtained in (a) by adding 0.01 to 5 parts by weight, based on 100 parts by weight of the graft core (B1a), based in each case on the solids content, of at least one copolymer (C) having an agglomerating effect, to obtain (B1),
(B2): at least one graft shell composed of at least one ethylenically unsaturated monomer (B20), obtainable by reacting the agglomerated graft core (B1) with the at least one ethylenically unsaturated monomer (B20),
wherein the at least one copolymer (C) having an agglomerating effect is obtainable (or is obtained) by:
  i) polymerizing (C1): 80 to 99.9% by weight of one or more hydrophobic C1- to C12-alkyl acrylates or C1- to C12-alkyl methacrylates,
  ii) adding at least one emulsifier (E),
  iii) adding and polymerizing (C2): 0.1 to 20% by weight of one or more hydrophilic comonomers (comonomer types) selected from the group consisting of acrylamide, methylacrylamide, ethylacrylamide and n-butylacrylamide,
  wherein (C1) and (C2) add up to 100% by weight (based on C1 and C2),
  wherein the addition of (C2) is carried out after the addition, in particular 2 to 100 min after the addition, of the emulsifier (E) in step ii).

The object is also achieved by a copolymer (C) having an agglomerating effect obtainable (or obtained) by:
i) polymerizing (C1): 80 to 99.9% by weight of one or more hydrophobic $C_1$- to $C_{12}$-alkyl acrylates or $C_1$- to $C_{12}$-alkyl methacrylates,
ii) adding (at least) one emulsifier (E),
iii) adding and polymerizing (C2): 0.1 to 20% by weight of one or more hydrophilic comonomers selected from the group consisting of acrylamide, methylacrylamide, ethylacrylamide and n-butylacrylamide,
wherein (C1) and (C2) add up to 100% by weight,
wherein the addition of (C2) is carried out after the addition, in particular 2 to 100 min after the addition, of (E) in step ii).

The ethylenically unsaturated monomer (B10) and the ethylenically unsaturated monomer (B20) may be based on different monomers or on identical monomers. Typical monomers are butadiene and styrene.

In step iii), the polymerization can be carried out simultaneously with the further addition of the emulsifier (E) or also after the addition. This is achieved, for example, by a delayed addition of the initiator required for the polymerization of (C2), while the emulsifier is further added.

The object is also achieved by a method for producing the graft copolymer (e.g. ABS) according to the invention and also by a thermoplastic molding composition comprising the graft copolymer according to the invention and use thereof.

A graft (co)polymer according to the present invention can be understood to mean a copolymer and a polymer whose macromolecules bear "grafted" side chains formed either from the same monomer molecules as the main chains (graft polymer) or from monomer molecules different therefrom. Here, the polymer or copolymer has a core and one or more graft shells.

Agglomerating according to the present invention can be understood to mean a particle enlargement or a "lumping".

The agglomerated graft core (B1) preferably has a bimodal particle size distribution having a fraction x) of non-agglomerated particles having a $d_{50}$ value in the range of 80 to 120 nm and a fraction y) of agglomerated particles having a $d_{50}$ value in the range of 350 to 550 nm. The graft core often has a polydispersity U of less than 0.35.

The copolymer (C) having an agglomerating effect preferably has a polydispersity U of less than 0.27 and a $d_{50}$ value of 80 to 180 nm.

The mean particle diameter $d_{50}$, which is also referred to as the $d_{50}$ value of the integral mass distribution, is defined here as the value at which 50% by weight of the particles have a smaller diameter and 50% by weight of the particles have a larger diameter than that $d_{50}$ value.

In the present application, the weight-average particle diameter $d_{50}$ is determined using a disc centrifuge (e.g.: DC 24000 from CPS Instruments Inc. with a disc rotation speed of 24 000 rpm). The weight-average particle diameter $d_w$ is defined according to the following formula (see G. Lagaly, Dispersionen und Emulsionen: eine Einführung in die Kolloidik feinverteilter Stoffe einschließlich der Tonminerale [Dispersions and Emulsions: an introduction to colloidal finely-divided substances including clay minerals], Darmstadt: Steinkopf-Verlag 1997, page 282, formula 8.3b):

$$d_w = \mathrm{sum}(n_i * d_i^4)/\mathrm{sum}(n_i * d_i^3)$$

$n_i$: number of particles having the diameter $d_i$

The non-uniformity U in the context of the present invention is a measure of the width of the particle size distribution in a particulate (co)polymer or a fraction of a particulate (co)polymer. In the context of the present application, the non-uniformity is defined as $$U = (d_{90} - d_{10})/d_{50}.$$

The smaller the value of U, the narrower the distribution.

Graft Core (B1)

In the context of the present invention, an ethylenically unsaturated monomer (B10) can be understood to be either (B11) and/or (B12).

As component (B12), in particular a diene component, it is possible to use, for example, isoprene and/or butadiene, preference being given to using butadiene.

As component (B11), it is possible to use alpha-methylstyrene and/or styrene, preference being given to using only styrene.

In the context of the present invention, an ethylenically unsaturated monomer (B10) is particularly preferably understood to mean a vinylaromatic, particularly styrene, and/or at least one diene, especially butadiene. Butadiene and styrene are frequently used as monomers.

For the graft core (B1), the diene component (B12), particularly butadiene, is generally used in an amount of 79 to 100% by weight, preferably 76 to 98% by weight, and the vinylaromatic component (B11), particularly styrene, is used in an amount of 0 to 21% by weight, preferably 2 to 14% by weight.

The graft core (B1) is preferably formed from butadiene and styrene in the aforementioned composition.

To produce the graft core (B1), the components (B12) and optionally (B11) are polymerized in aqueous emulsion, according to methods known in principle to those skilled in the art, generally at temperatures of 20 to 100° C., preferably 50 to 90° C.

In the polymerization, the customary emulsifiers may be used, such as, for example, alkali metal salts of alkyl or arylsulfonic acids, alkyl sulfates, fatty alcohol sulfonates, salts of higher fatty acids having 10 to 30 carbon atoms or resin soaps. Preference is given to using sodium or potassium salts of alkyl sulfonates or fatty acids having 10 to 18 carbon atoms. It is favorable to use the emulsifier(s) in an amount of 0.5 to 5% by weight, preferably 0.5 to 2% by weight, based on the total weight of the monomers used for the graft core (B1). In general, the water/monomer ratio used is from 2:1 to 0.7:1.

Suitable polymerization initiators are in particular the customary persulfates, such as potassium peroxodisulfate, but redox systems are also suitable. The amounts of initiators, for example from 0.1 to 1% by weight, based on the total weight of the monomers used for the preparation of the graft core (B1), depends on the desired molecular weight.

As polymerization auxiliaries, the customary buffer substances may be used, sodium bicarbonate and sodium pyrophosphate for example, by which the pH values are adjusted preferably to 6-10, and also in general 0.1 to 3% by weight of a molecular weight regulator such as mercaptans, terpinol or dimeric α-methylstyrene.

The precise polymerization conditions, in particular the type, dosage and amount of the emulsifier, are selected within the ranges specified above such that the graft core (B1) has a $d_{50}$ value as defined below, as described, for example, in DE-A-2427960.

The agglomerated graft core (B1) preferably has a bimodal particle size distribution having a fraction x) of non-agglomerated particles having a $d_{50}$ value in the range of 80 to 120 nm and a fraction y) of agglomerated particles having a $d_{50}$ value in the range of 350 to 550 nm and a polydispersity U of less than 0.35.

The graft core (B1) particularly preferably has a $d_{50}$ value in the range from 80 to 110 nm, particularly preferably 85 to 110 nm.

The polydispersity U of the graft core (B1) is preferably less than 0.35, particularly less than 0.33. A graft core is preferred having a $d_{50}$ value in the range from 80 to 120 nm and a polydispersity U of less than 0.35, particularly less than 0.33.

In the present application, the weight-average particle diameter $d_w$ is determined with the aid of a disc centrifuge (e.g.: DC 24000 from CPS Instruments Inc. with a disc rotation speed of 24 000 rpm).

The summation of the aforementioned formula is carried out from the smallest up to the largest diameter of the particle size distribution. It should be noted that for a particle size distribution of particles having the same density, the volume-average particle diameter $d_v$ is equal to the weight-average particle diameter $d_w$.

$d_{10}$ and $d_{90}$ are defined as follows: $d_{10}$ is the diameter at which 10% by weight of the particles are less than this value and $d_{90}$ is the diameter at which 90% by weight of the particles are less than this value.

The non-uniformity or polydispersity U in the context of the present invention is a measure of the width of the particle size distribution in a particulate (co)polymer or a fraction of a particulate (co)polymer. In the context of the present application, polydispersity U is defined as $U=(d_{90}-d_{10})/d_{50}$. The smaller the value of U, the narrower the distribution.

Copolymer (C) Having an Agglomerating Effect

In the context of the present invention, a copolymer (C) having an agglomerating effect is preferably understood to mean a polymer composed of at least one or more hydrophobic $C_1$- to $C_{12}$-alkyl acrylates, $C_1$- to $C_{12}$-alkyl methacrylates and/or one or more hydrophilic comonomers selected from the group consisting of acrylamide, methylacrylamide, ethylacrylamide and n-butylacrylamide.

In the context of the present invention, a copolymer (C) having an agglomerating effect can be understood to mean a copolymer composed of (C1) and (C2).

The monomers (C1) used are preferably $C_1$-$C_4$-alkyl acrylates or also mixtures thereof. Particular preference is given to ethyl acrylate as monomer (C1).

The monomers (C2) used are preferably the hydrophilic monomers acrylamide, methylacrylamide, ethylacrylamide and n-butylacrylamide. Preference is given to methacrylamide as monomer (C2).

To agglomerate the graft core (B1), a component having an agglomerating effect (copolymer (C)) is used, i.e. a copolymer composed of (C1) one or more hydrophobic $C_1$- to $C_{12}$-alkyl acrylates or $C_1$- to $C_{12}$-alkyl methacrylates and (C2) one or more hydrophilic comonomers selected from the group consisting of acrylamide, methylacrylamide, ethylacrylamide and n-butylacrylamide.

The copolymer (C) having an agglomerating effect has in accordance with the invention a polydispersity U of less than 0.27 and a $d_{50}$ value of 80 to 180 nm.

The composition to obtain the copolymer (C) is generally as follows:

(C1) 80 to 99.9, preferably 90 to 99.9% by weight of component (C1) and (C2) 0.1 to 20, preferably 0.1 to 10% by weight of component (C2), wherein the sum of the monomers (C1) and (C2) is exactly 100% by weight (of the component C).

The monomers (C1) used are preferably $C_1$-$C_2$-alkyl acrylates or also mixtures thereof.

Preference is given to ethyl acrylate as monomer (C1).

Preference is given to methacrylamide as monomer (C2).

A copolymer of ethyl acrylate and methylacrylamide is preferably used as copolymer (C). Particular preference is given to a copolymer (C) comprising 92 to 98% by weight ethyl acrylate, based on the total solids content in (C), and 2 to 8% by weight methacrylamide, based on the total solids content in (C). Very particular preference is given to a copolymer (C) comprising 93 to 97% by weight ethyl acrylate, based on the total solids content in (C), and 3 to 7% by weight methacrylamide, based on the total solids content in (C).

Preference is given to copolymers (C) having a molecular weight ($M_w$) of 30 000 to 300 000 g/mol, where $M_w$ may be determined by conventional methods.

Particular preference is given to a copolymer (C) which has a core which is composed of at least one of the hydrophobic monomers mentioned as component (C1), preferably ethyl acrylate, this core being grafted with a copolymer composed of the components (C1) and (C2). Preferably, therefore, the copolymer (C) is a core/shell polymer.

The copolymer (C) having an agglomerating effect preferably has a core and a shell, wherein the core consists of (C1), particularly ethyl acrylate, and wherein the shell consists of 85 to 99.9% by weight (C1), particularly ethyl acrylate, and 0.1 to 15% by weight (C2), particularly methylacrylamide, wherein (C1) and (C2) in the shell add up to 100% by weight.

The core preferably accounts for 3 to 20% by weight and the shell accounts for 80 to 97% by weight of the copolymer having an agglomerating effect, wherein the total weight of core and shell adds up to 100%.

Particularly preferably, the copolymer (C) is composed of (or consists of):

($c_{11}$) 5 to 20% by weight, based on the total weight of the copolymer (C), of one or more hydrophobic monomers (C1), preferably ethyl acrylate, as core;

($c_{12}$) 80 to 95% by weight, based on the total weight of the copolymer (C), of a shell grafted onto the core composed of ($c_{121}$) 93 to 97% by weight, based on the total weight of the monomers forming the shell, of at least one hydrophobic monomer (C1), preferably ethyl acrylate;

($c_{122}$) 3 to 7% by weight, based on the total weight of the monomers forming the shell, of at least one hydrophilic monomer (C2), preferably methacrylamide.

Especially preferably, the copolymer (C) is composed of (or consists of):

($c_{11}$) 8 to 12% by weight ethyl acrylate, based on the total weight of the copolymer (C), as the core, and ($c_{12}$) 88 to 92% by weight, based on the total weight of the copolymer (C), of a shell grafted onto the core composed of ($c_{121}$) 93 to 97% by weight ethyl acrylate, based on the total weight of the monomers forming the shell and ($c_{122}$) 3 to 7% by weight methacrylamide, based on the total weight of the monomers forming the shell.

The abovementioned embodiments to the copolymer (C) preferably correspond to the compositions to obtain the agglomerating copolymer (C) by polymerization.

Accordingly, a method is preferred for producing the component (C) having an agglomerating effect, comprising monomer components (C1) and (C2), in particular ethyl acrylate and methacrylamide, in which initially a portion of (C1), in particular ethyl acrylate, is polymerized (formation of the core), and subsequently at least one emulsifier (E) is added, followed by addition and polymerization of (C2), in particular methylacrylamide. The addition is carried out in a time-delayed manner, i.e. at least 1 s, in particular 2 min, after addition of the emulsifier (E). The addition is particularly preferably carried out 10 min after the addition of the emusifier (E). The addition (of emulsifier (E)) can be understood to mean the first addition, for example into a reactor.

The copolymer (C) having an agglomerating effect used according to the invention is prepared by processes known to the person skilled in the art, particularly advantageously by emulsion polymerization, it being possible to use the emulsifiers mentioned above for the graft core (B1).

Preference is given here in accordance with the invention to using the sodium and potassium salts of alkyl sulfonates having 10 to 18 carbon atoms.

The emulsifiers are advantageously used in an amount of 0.5 to 5% by weight, preferably 0.5 to 2% by weight, based on the total monomer content of the copolymer (C).

The invention further relates to a copolymer (C) having an agglomerating effect, obtainable (or obtained) by:
i) polymerizing (C1): 80 to 99.9% by weight of one or more hydrophobic $C_1$- to $C_{12}$-alkyl acrylates or $C_1$- to $C_{12}$-alkyl methacrylates,
ii) adding an emulsifier (E),
iii) adding and polymerizing (C2): 0.1 to 20% by weight of one or more hydrophilic comonomers selected from the group consisting of acrylamide, methylacrylamide, ethylacrylamide and n-butylacrylamide, wherein (C1) and (C2) add up to 100% by weight,
  wherein the addition of (C2) is carried out after the addition, in particular 2 to 100 min after the addition, of (E) in step ii).

The at least one copolymer (C) having an agglomerating effect is preferably obtained by
i) polymerizing (C1): 80 to 99.9% by weight of one or more hydrophobic $C_1$- to $C_{12}$-alkyl acrylates or $C_1$- to $C_{12}$-alkyl methacrylates, in particular by an emulsion polymerization
ii) adding an emulsifier (E), wherein the emulsifier is selected from the group consisting of sodium and potassium salts of alkyl sulfonates having 10 to 18 carbon atoms, and
iii) adding and polymerizing (C2): 0.1 to 20% by weight of one or more hydrophilic comonomers selected from the group consisting of acrylamide, methylacrylamide, ethylacrylamide and n-butylacrylamide, wherein (C1) and (C2) add up to 100% by weight,
  wherein the addition of (C2) is carried out from 2 to 100 min, in particular 2 to 60 min, after the addition of (E) in step ii).

The addition of (C2) in step iii) is preferably carried out 2 min after the addition of (E) in step ii) and lasts 20 min.

The addition of (C2) in step iii) is preferably carried out 20 min after the addition of (E) in step ii) and lasts up to 70 min.

The addition of (C2) in step iii) is particularly preferably carried out 25 min after the addition of (E) in step ii) and lasts 30 to 50 min.

In the context of the present invention, "after the addition of (E)" is understood to mean that the addition of (C2) is carried out with a time delay after the start of the addition of at least a portion of the total amount of (E).

The copolymer (C) is preferably used as an aqueous dispersion, as a so-called agglomeration latex.

The copolymer (C) having an agglomerating effect preferably has a polydispersity U of less than 0.26, particularly preferably less than 0.25. According to a preferred embodiment, the polydispersity U of the copolymer (C) having an agglomerating effect is in the range of 0.26 to 0.20, particularly in the range of 0.25 to 0.21.

The copolymer (C) having an agglomerating effect preferably has an average particle size $d_{50}$ of 110 to 140 nm, particularly preferably 115 to 140 nm, especially preferably 120 to 135 nm.

According to a preferred embodiment, a copolymer (C) having an agglomerating effect is used having a polydispersity U of less than 0.26, in particular less than 0.25, and a $d_{50}$ value of 110 to 140 nm, in particular 115 to 140 nm, especially preferably 120 to 135 nm.

According to a further preferred embodiment, a copolymer (C) having an agglomerating effect is used having a polydispersity U in the range of 0.26 to 0.20, in particular in the range of 0.25 to 0.21, and a $d_{50}$ value of 100 to 150, preferably 110 to 140 nm, in particular 115 to 140 nm, especially preferably 120 to 135 nm.

In the context of the present application, the embodiments mentioned above may be combined with one another.

Particularly preferably, a copolymer (C) is used composed of 92 to 98% by weight ethyl acrylate, based on the total solids in (C), and 2 to 8% by weight methylacrylamide, based on the total solids in (C), having a polydispersity U of less than 0.26, in particular less than 0.25, and a $d_{50}$ value of 110 to 140 nm, in particular 115 to 140 nm, especially preferably 120 to 135 nm.

Agglomeration of the Graft Core (B1)

The agglomeration of the graft core (B1a) is generally effected by adding a dispersion of the copolymer (C) described above. The concentration of the copolymer (C) in the dispersion used for the agglomeration should generally be between 3 and 60% by weight, preferably between 5 and 40% by weight. An aqueous dispersion is often used.

In the agglomeration, generally 0.1 to 5 parts by weight, preferably 0.5 to 3 parts by weight of the dispersion of the copolymer (C) are used to 100 parts of the graft core (B1a), calculated in each case based on solids.

Particularly preferably, the graft core (B1) obtained in step (a) is agglomerated with at least one copolymer (C) having an agglomerating effect by adding 2.0 to 3 parts by weight, based on 100 parts by weight of the graft core (B1a), based in each case on the solids content.

The agglomeration is preferably conducted at a temperature of 20 to 120° C., preferably 30 to 100° C., particularly preferably 30 to 75° C.

The component (C) can be added all at once or in portions, continuously or using a feed profile over a certain period of time. According to a preferred embodiment, addition of (C) is carried out such that 1/1 to 1/100, often 1/20 to 1/60, of the total amount of C are introduced per minute. The agglomeration time, i.e. the time from the start of the addition of (C) up to the start of the subsequent graft copolymerization, is preferably from one minute up to several hours, for example up to 2 hours, particularly preferably from 10 to 60 minutes.

If desired, basic electrolytes can be added for the agglomeration in an amount of from 1 to 50% by weight (based on 100% by weight of the solids content of the copolymer (C)). Suitable basic electrolytes are organic or inorganic hydroxides. Inorganic hydroxides are especially suitable. Preference is given to using lithium hydroxide, sodium hydroxide or potassium hydroxide. According to one of the particularly preferred embodiments, KOH is used as basic electrolyte. According to another preferred embodiment, NaOH is used as basic electrolyte. However, it is also possible to use mixtures of two or more basic electrolytes. This can be advantageous, for example, if the growth of the rubber particles is to be precisely controlled. For instance, it can be favorable, for example, to use mixtures of LiOH with KOH or mixtures of LiOH with NaOH. It is also possible to use mixtures of KOH and NaOH and counts as a further preferred embodiment. In general, the electrolytes are dissolved prior to addition. The preferred solvent is the aqueous phase.

Preference is given to using dilute solutions, for example solutions having a concentration in the range of 0.001 to 0.1, in particular 0.001 to 0.05, but preferably less than 0.03, for example less than 0.025 g of basic electrolyte/ml of solvent, particularly water.

The basic electrolyte may be added prior to the addition of the copolymer (C), simultaneously together or separately from this copolymer or after addition of (B1). It is also possible to pre-mix the basic electrolytes in the dispersion of (C).

According to a preferred embodiment, the basic electrolytes are added prior to addition of the agglomeration polymer. In general, the basic electrolyte is used in an amount of 0.01 to 4% by weight, preferably 0.05 to 2.5, especially 0.1 to 1.5% by weight, based on the (B1a) (solid).

The pH during the agglomeration is generally from 6 to 13. According to a preferred embodiment, the pH is from 8 to 13.

Agglomerated Graft Core (B1)

Preferably, the agglomerated graft core (B1) obtained after the agglomeration may have a bimodal particle distribution of fractions x) and y), where x) is a fraction of non-agglomerated particles and y) is a fraction of agglomerated particles having a $d_{50}$ value (average particle size) in the range of 350 to 550 nm and a polydispersity U of less than 0.28. The non-agglomerated particles of fraction x) generally have a $d_{50}$ value in the range of 80 to 120 nm.

The proportion by weight of the particles of fraction x) of the non-agglomerated graft core (B1) is generally 10 to 40% by weight, preferably 10 to 21% by weight, and the proportion of particles of fraction y) is 60 to 90% by weight, preferably 79 to 90% by weight, relative to the total mass of particles, x) and y) together adding up to 100% by weight.

The agglomerated graft core (B1) preferably has a fraction y) of agglomerated particles having a $d_{50}$ value in the range of 350 to 500 nm, particularly preferably 350 to 450 nm, especially preferably 350 to 400 nm, and/or a polydispersity U of less than 0.27, especially less than 0.26.

The dispersion obtained of the agglomerated graft core (B1) is stable and may be readily stored and transported without coagulation occurring.

The graft copolymer (B) according to the invention is preferably prepared from the agglomerated graft core (B1).

Graft Copolymer (B)

In the context of the present invention, an ethylenically unsaturated monomer (B20) is preferably understood to mean styrene, α-methylstyrene, acrylonitrile, methyl methacrylate, but particularly styrene and methyl methacrylate or acrylonitrile.

In the context of the present invention, an ethylenically unsaturated monomer (B20) is also understood to be (B21) and/or (B22).

Monomers (B21) are preferably understood to mean styrene and/or α-methylstyrene. Preference is given to styrene as monomer (B21).

Monomers (B21) are preferably understood to mean acrylonitrile and/or methyl methacrylate. Preference is given to acrylonitrile as monomer (B22).

To prepare the graft copolymers (B) according to the invention, the agglomerated graft core (B1) is grafted with the monomers (B21) and (B22).

The graft copolymer (B) generally comprises 40 to 85% by weight, based on the solids content of graft copolymer (B), of a graft core (B1) and 15 to 60% by weight, based on the solids content of graft copolymer B, of at least one graft shell (B2). The sum of (B1) and (B2) adds up to 100% by weight.

The graft shell (B2) may be obtained, for example, by reacting (B21) 70 to 90% by weight, preferably 75 to 85% by weight, of styrene and/or α-methylstyrene, especially styrene, and (B22) 10 to 30% by weight, preferably 15 to 25% by weight, acrylonitrile, methacrylonitrile and/or methyl methacrylate, especially acrylonitrile, in the presence of the agglomerated graft core (B1). The sum of (B21) and (B22) adds up to 100% by weight.

Preferred graft shells (B2) are composed of: copolymers of styrene and acrylonitrile, copolymers of a-methylstyrene and acrylonitrile. Particular preference is given to copolymers of styrene and acrylonitrile.

Particularly preferred graft shells (B2) are obtained by reacting 75 to 85% by weight styrene and 15 to 25% by weight acrylonitrile.

The graft shell (B2) is produced by carrying out the agglomeration of the graft core (B1) described above, preferably by an emulsion polymerization process.

The graft copolymerization to generate the graft shell (B2) can take place in the same system as the emulsion polymerization for the production of the graft core (B1), where, if necessary, further emulsifiers and auxiliaries may be added. The monomer mixture to be grafted according to one embodiment of the invention can be added to the reaction mixture all at once, distributed over several stages—for example to build up two or more graft shells (graft coatings)—or continuously during the polymerization. The monomers (B21) and (B22), especially styrene and acrylonitrile, can also preferably be added simultaneously.

According to one embodiment of the invention, the graft shell (B2) is polymerized in the presence of the agglomerated graft core (B1) of a monomer mixture, consisting of the components (B21) and (B22), especially styrene and acrylonitrile, obtained by the method described above. In this case, the monomers can be added singly or in mixtures with each other. For example, initially (B21) alone and then a mixture of (B21 and (B22) can be grafted.

It is advantageous to carry out this graft polymerization in aqueous emulsion under the customary conditions described above for the graft core. Details regarding conducting the grafting reaction are known to those skilled in the art and are disclosed, for example, in DE-A 24 27 960 and EP-A 0 062 901.

The graft copolymer (B) is preferably composed of:
(B1): an agglomerated graft core (B1), composed of: 40 to 85% by weight, based on the solids content of the graft copolymer B, of a graft core (B1a), wherein (B1) is obtainable by
  (a) polymerizing at least one ethylenically unsaturated monomer (B10) to give a graft core (B1a), and
  (b) agglomeration of the graft core (B1a) obtained in (a) by adding 0.01 to 5 parts by weight, based on 100 parts by weight of the graft core (B1a), based in each case on the solids content, of at least one copolymer (C) having an agglomerating effect, to obtain (B1),
(B2): 15 to 60% by weight, based on the solids content of the graft copolymer (B), of a graft shell composed of at least one ethylenically unsaturated monomer (B20), obtainable by reacting the agglomerated graft core (B1) with the at least one ethylenically unsaturated monomer (B20), wherein the sum total of graft core (B1a) and graft shell (B2) adds up to 100% by weight, wherein the at least one copolymer (C) having an agglomerating effect is obtainable by:

i) polymerizing (C1): 80 to 99.9% by weight of one or more hydrophobic $C_1$- to $C_{12}$-alkyl acrylates or $C_1$- to $C_{12}$-alkyl methacrylates, ii) adding at least one emulsifier (E), iii) adding and polymerizing (C2): 0.1 to 20% by weight of one or more hydrophilic comonomers selected from the group consisting of acrylamide, methylacrylamide, ethylacrylamide and n-butylacrylamide, wherein (C1) and (C2) add up to 100% by weight, wherein the addition of (C2) is carried out 2 to 100 min after the addition of (E) in step ii).

The amounts of the components (B1), (B1a), (C), (B2) are preferably based in each case on their solids contents.

The graft copolymer (B) is particularly preferably composed of:

(B1): an agglomerated graft core (B1), composed of: 40 to 85% by weight, based on the solids content of the graft copolymer (B), of a graft core (B1a), wherein (B1) is obtainable by (a) polymerizing:

(B11): 0 to 10% by weight or 0 to 21% by weight, in particular 1 to 10% by weight or 1 to 21% by weight, based on the graft core (B1a), of at least one vinyl aromatic, especially styrene, and (B12): 90 to 100% by weight or 79 to 100% by weight, in particular 90 to 99% by weight or 79 to 99% by weight, based on the graft core (B1a), of at least one diene, especially butadiene, wherein (B11) and (B12) add up to 100% by weight, and (b) agglomeration of the graft core (B1a) obtained in (a) by adding 0.01 to 5 parts by weight, based on 100 parts by weight of the graft core (B1a), based in each case on the solids content, of at least one copolymer (C) having an agglomerating effect, to obtain (B1), wherein (C) is composed of:

(C1): 80 to 99.9% by weight of one or more hydrophobic $C_1$- to $C_{12}$-alkyl acrylates or $C_1$- to $C_{12}$-alkyl methacrylates and (C2): 0.1 to 20% by weight of one or more hydrophilic comonomers selected from the group consisting of acrylamide, methylacrylamide, ethylacrylamide and n-butylacrylamide, wherein (C1) and (C2) add up to 100% by weight;

(B2): 15 to 60% by weight, based on the solids content of the graft opolymer (B), of a graft shell composed of at least one ethylenically unsaturated monomer (B20), wherein (B20) comprises a mixture of the monomers (B21) and (B22), obtainable by reacting the agglomerated graft core (B1) with a mixture of:

(B21) 70 to 90% by weight, based on the graft shell (B2), styrene and/or a-methylstyrene, especially styrene, and (B22) 10 to 30% by weight, based on the graft shell (B2), acrylonitrile and/or methyl methacrylate, especially acrylonitrile, wherein the sum total of graft core (B1a) and graft shell (B2) adds up to 100% by weight, wherein the copolymer (C) having an agglomerating effect is obtainable by i) polymerizing (C1): 80 to 99.9% by weight of one or more hydrophobic $C_1$- to $C_{12}$-alkyl acrylates or $C_1$- to $C_{12}$-alkyl methacrylates, ii) adding at least one emulsifier (E), iii) adding and polymerizing (C2): 0.1 to 20% by weight of one or more hydrophilic comonomers selected from the group consisting of acrylamide, methylacrylamide, ethylacrylamide and n-butylacrylamide, wherein (C1) and (C2) add up to 100% by weight, wherein the addition of (C2) is carried out 2 to 100 min after the addition of (E) in step ii).

The graft copolymer (B) preferably consists of:

(B1): an agglomerated graft core (B1), composed of: 40 to 85% by weight, based on the solids content of the graft copolymer (B), of a graft core (B1a), wherein (B1) is obtainable by (a) polymerizing:

(B11): 0 to 10% by weight or 0 to 21% by weight, in particular 1 to 10% by weight or 1 to 21% by weight, based on the graft core (B1a), of at least one vinyl aromatic, especially styrene, and (B12): 90 to 100% by weight or 79 to 100% by weight, in based on the graft core (B1a), of at least one diene, especially butadiene, wherein (B11) and (B12) add up to 100% by weight, and (b) agglomeration of the graft core (B1a) obtained in (a) by adding 0.01 to 5 parts by weight, based on 100 parts by weight of the graft core (B1a), based in each case on the solids content, of at least one copolymer (C) having an agglomerating effect, to obtain (B1), wherein (C) is composed of:

(C1): 80 to 99.9% by weight of one or more hydrophobic $C_1$- to $C_{12}$-alkyl acrylates or $C_1$- to $C_{12}$-alkyl methacrylates and (C2): 0.1 to 20% by weight of one or more hydrophilic comonomers selected from the group consisting of acrylamide, methylacrylamide, ethylacrylamide and n-butylacrylamide, wherein (C1) and (C2) add up to 100% by weight;

(B2): 15 to 60% by weight, based on the solids content of the graft copolymer (B), of a graft shell composed of at least one ethylenically unsaturated monomer (B20), wherein (B20) comprises a mixture of the monomers (B21) and (B22), obtainable by reacting the agglomerated graft core (B1) with a mixture of:

(B21) 70 to 90% by weight, based on the graft shell (B2), styrene and/or α-methylstyrene, especially styrene, (B22) 10 to 30% by weight, based on the graft shell (B2), acrylonitrile and/or methyl methacrylate, especially acrylonitrile, wherein the sum total of graft core (B1a) and graft shell (B2) adds up to 100% by weight, wherein the copolymer (C) having an agglomerating effect is obtainable by i) polymerizing (C1): 80 to 99.9% by weight of one or more hydrophobic $C_1$- to $C_{12}$-alkyl acrylates or $C_1$- to $C_{12}$-alkyl methacrylates, ii) adding at least one emulsifier (E), iii) adding and polymerizing (C2): 0.1 to 20% by weight of one or more hydrophilic comonomers selected from the group consisting of acrylamide, methylacrylamide, ethylacrylamide and n-butylacrylamide, wherein (C1) and (C2) add up to 100% by weight,
wherein the addition of (C2) is carried out 2 to 100 min after the addition of (E) in step ii).

Particularly preferably, the graft core (B1) obtained in step (a) is agglomerated with at least one copolymer (C) having an agglomerating effect by adding 2.0 to 3 parts by weight, based on 100 parts by weight of the graft core (B1a), based in each case on the solids content.

The addition of the at least one emulsifier (E) and (C2) preferably terminates simultaneously. The addition of the at least one emulsifier (E), (C2) and the initiator required for the polymerization of (C2) preferably terminates simultaneously.

The graft copolymers (B) according to the invention can thus be further used as they occur in the reaction mixture, for example as latex emulsion or latex dispersion. Alternatively, they can also be worked up in a further step. Measures for work-up are known in principle to those skilled in the art.

The work-up steps include, for example, the isolation of the graft copolymers (B) from the reaction mixture, for example by spray drying, shearing or by precipitation with strong acids or by other precipitating agents, for example composed of inorganic compounds such as magnesium sulfate. The work-up steps also include drying the isolated rubber. The solids content of the dispersion of the graft rubber is ca. 40% by weight.

The invention further relates to a process for producing a graft polymer according to the invention by:
(I) polymerizing at least one ethylenically unsaturated monomer (B10) in aqueous emulsion to give the graft core (B1a),
(II) agglomeration of the graft core (B1a) present in the emulsion by means of at least one copolymer (C) having an agglomerating effect, and subsequently
(III) polymerizing at least one ethylenically unsaturated monomer (B20) to give a graft shell in aqueous emulsion in the presence of the agglomerated graft core (B1).

(B), (B12), (B11), (B1), (C), (B21) and (B22) are defined as specified for the graft copolymer according to the invention, in particular the amounts stated above.

According to the method according to the invention, the resulting particulate graft core (B1) generally has a $d_{50}$ value of 80 to 120 nm.

Molding Compositions

The present invention further relates to a thermoplastic molding composition comprising at least one thermoplastic copolymer (A) and at least one graft copolymer (B) according to the invention and also optionally a further component (K). The molding composition comprises in particular:
(A): 40 to 80% by weight of at least one thermoplastic copolymer (A) obtainable (or obtained) from:
(A1): 20 to 31% by weight acrylonitrile, based on the copolymer (A), and
(A2): 69 to 80% by weight styrene or α-methylstyrene or a mixture of styrene and α-methylstyrene, based on the copolymer (A),
(B): 20 to 60% by weight of the graft copolymer (B); and
(K): 0 to 5% by weight further components (K),
wherein the sum total of (A), (B) and (K) is 100% by weight.

Copolymer (A)

The copolymer (A) is preferably produced from the components acrylonitrile and styrene and/or α-methylstyrene by bulk polymerization or in the presence of one or more solvents. Preference is given in this case to copolymers (A) having molar masses $M_w$ of 50 000 to 300 000 g/mol, wherein the molar masses may be determined, for example, by light scattering in tetrahydrofuran (GPC with UV detection). The copolymer (A) forms the matrix of the thermoplastic molding composition.

The copolymer (A) may in particular comprise or consist of:
(Aa) polystyrene-acrylonitrile, produced from 69 to 80% by weight styrene and 20 to 31% by weight acrylonitrile, based on (Aa), or
(Ab) poly-α-methylstyrene-acrylonitrile, produced from 69 to 80% by weight α-methylstyrene and 20 to 31% by weight acrylonitrile, based on (Ab), or
(Ac) a mixture of the copolymer matrix (Aa) and the copolymer matrix (Ab).

The copolymer (A) may also be obtained by copolymerization of acrylonitrile, styrene and α-methylstyrene. In principle, however, polymer matrices comprising further monomer units are also usable. The copolymer (A) is preferably composed of the monomers styrene and acrylonitrile.

The number-average molecular weight ($M_n$) of copolymer A, also copolymer matrix A, is preferably from 15 000 to 100 000 g/mol (determined by means of GPC with UV detection). The viscosity (Vz) of the copolymer matrix A (measured according to DIN 53726 at 25° C. in a 0.5% by weight solution in DMF) is, for example, from 50 to 120 ml/g. By means of bulk polymerization or solution polymerization in, for example, toluene or ethylbenzene, the copolymer matrix A may be produced by a method such as described for example in the Kunststoff-Handbuch [Plastics Handbook], Vieweg-Daumiller, Volume V, (Polystyrene), Carl-Hanser-Verlag, Munich 1969, pages 122 f., lines 12 ff.

As already described above, the preferred copolymer matrix component A is a polystyrene-acrylonitrile, poly-α-methylstyrene-acrylonitrile or mixtures thereof. In a preferred embodiment of the invention, the component A, after production according to the method known to those skilled in the art, is isolated and preferably processed to granules.

In one embodiment of the invention, the thermoplastic molding composition additionally comprises at least one further thermoplastic polymer (TP) selected from the group of polycarbonates, polyestercarbonates, polyesters and polyamides.

The copolymers A used in the molding composition according to the invention may also be mixed, for example, with further thermoplastic polymers (TP). Particularly suitable in this case are semi-crystalline polyamides, part-aromatic copolyamides, polyesters, polyoxyalkylene, polyarylene sulfides, polyether ketones, polyvinyl chlorides and/or polycarbonates.

The suitable polycarbonates or polyestercarbonates may be linear or branched. Branched products are preferably obtained by incorporating 0.05 to 2.0 mol %, based on the sum of the diphenols used, of tri- or more than trifunctional compounds, for example, those having three or more than three phenolic OH groups. The polycarbonates or polyestercarbonates may comprise aromatically bound halogen, preferably bromine and/or chlorine. However, they are preferably halogen-free. They have average molecular weights ($M_w$, weight-average; determined e.g. by ultracentrifugation or scattered light measurement) of 10 000 to 200 000, preferably 20 000 to 80 000.

Suitable thermoplastic polyesters are preferably polyalkylene terephthalates, i.e. reaction products of aromatic dicarboxylic acids or their reactive derivatives (e.g. dimethyl esters or anhydrides) and aliphatic, cycloaliphatic or arylaliphatic diols and mixtures of such reaction products. Preferred polyalkylene terephthalates can be prepared by known methods from terephthalic acid (or reactive derivatives thereof) and aliphatic or cycloaliphatic diols having 2 to 10 carbon atoms (see Kunststoff-Handbuch [Plastics Handbook], Volume VIII. p. 695 ff, Carl Hanser Verlag, Munich 1973).

Suitable polyamides are known homopolyamides, copolyamides and mixtures of these polyamides. They may be semi-crystalline and/or amorphous polyamides. Suitable semi-crystalline polyamides are polyamide-6, polyamide-6.6, mixtures and corresponding copolymers of these components. Furthermore, semi-crystalline polyamides are suitable, the acid component of which is wholly or partly composed of terephthalic acid and/or isophthalic acid and/or suberic acid and/or sebacic acid and/or azelaic acid and/or adipic acid and/or cyclohexanedicarboxylic acid, the diamine component of which is wholly or partly composed of m- and/or p-xylylenediamine and/or hexamethylenediamine and/or 2,2,4-trimethylhexamethylenediamine and/or 2,2,4-trimethylhexamethylenediamine and/or isophoronediamine and the composition of which is known. In addition, polyamides are to be mentioned which are prepared in whole or in part from lactams having 7-12 carbon atoms in the ring, optionally with the addition of one or more of the abovementioned starting components.

As amorphous polyamides, known products can be used which are obtained by polycondensation of diamines such as ethylenediamine, hexamethylenediamine, decamethylenediamine, 2,2,4- and/or 2,4,4-trimethylhexamethylenediamine, m- and/or p-xylylenediamine, bis(4-aminocyclohexyl)methane, bis(4-aminocyclohexyl)propane, 3,3'-dimethyl-4,4'-diaminodicyclohexAmethane, 3-am inomethyl-3,5,5-trimethylcyclohexylamine, 2,5- and/or 2,6-bis(aminomethyl) norbornane and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

It is also possible to use mixtures of two or more of the polymers (TP) specified. The thermoplastic molding compositions according to the invention may comprise, based on the amount of copolymer A plus graft copolymer B, from 0 to 90% by weight, preferably 0 to 50% by weight, particularly preferably 0 to 20% by weight, of the abovementioned polymers (TP).

Preference is given to a thermoplastic molding composition according to the invention consisting of copolymer A and graft copolymer B and optionally further components K.

As further components (K), the thermoplastic molding composition may comprise one or more components selected from the group consisting of dispersants (DM), fillers (F) and additives (D).

The thermoplastic molding compositions according to the invention may also comprise, as component (K), from 0 to 5% by weight, often from 0.1 to 5% by weight, of fiber or particulate fillers (F) or mixtures thereof, based in each case on the amount of the components A plus B plus K. For example, glass beads, mineral fibers, aluminum oxide fibers, mica, quartz powder or wollastonite can be added as fillers or reinforcing materials to glass fibers which can be equipped with a size and an adhesion promoter. In addition, metal flakes, metal powders, metal fibers, metal-coated fillers, for example, nickel-coated glass fibers and also other additives which shield electromagnetic waves can be added to the molding compositions according to the invention. In addition, carbon fibers, carbon black, especially conductive carbon black or nickel-coated carbon fibers may be added.

Various additives (D) in amounts from 0 to 5% by weight, often from 0.1 to 5% by weight, may be added to the molding compositions according to the invention as auxiliaries and processing additives. Suitable as additives (D) are all those substances which are typically used for processing or finishing polymers.

Examples include dyes, pigments, coloring agents, antistatic agents, antioxidants, stabilizers for improving thermostability, stabilizers for increasing light stability, stabilizers for increasing resistance to hydrolysis and chemical resistance, agents to counter heat decomposition and, in particular, lubricants which are useful for the preparation of moldings or molded parts. The metering in of these further additives can be carried out at any stage of the preparation process, but preferably at an early time point in order to take advantage of the stabilizing effects (or other special effects) of the additive at an early stage. With regard to further customary auxiliaries and additives, reference is made to, for example "Plastics Additives Handbook", Ed. Gächter and Müller, 4th edition, Hanser Publ., Munich, 1996.

Suitable pigments are, for example, titanium dioxide, phthalocyanines, ultramarine blue, iron oxides or carbon black, and the entire class of organic pigments.

Suitable coloring agents are, for example, all dyes which can be used for the transparent, semi-transparent or non-transparent coloration of polymers, in particular those which are suitable for the coloring of styrene copolymers.

As suitable flame retardants, it is possible to use, for example, the halogen-containing or phosphorus-containing compounds known to those skilled in the art, magnesium hydroxide, and other customary compounds, or mixtures thereof.

Suitable antioxidants are, for example, sterically hindered monocyclic or polycyclic phenolic antioxidants, which can be substituted in various ways and can also be bridged via substituents. In addition to monomeric compounds, these also include oligomeric compounds which may be composed of two or more phenolic core structures. Hydroquinones and hydroquinone-analog substituted compounds are also suitable, as are antioxidants based on tocopherols and derivatives thereof. It is also possible to use mixtures of different antioxidants.

In principle, all commercially available compounds or compounds suitable for styrene copolymers may be used, for example, antioxidants from the Irganox series. Together with the phenolic antioxidants mentioned above by way of example, so-called co-stabilizers can be used, in particular phosphorus or sulfur-containing co-stabilizers. Such P- or S-containing co-stabilizers are known to those skilled in the art.

Suitable stabilizers against light exposure are, for example, various substituted resorcinols, salicylates, benzotriazoles and benzophenones. Useful matting agents are both inorganic substances such as talc, glass beads or metal carbonates (such as, e.g. $MgCO_3$, $CaCO_3$), and also polymer particles—in particular spherical particles having $d_{50}$ diameters over 1 mm—based on, for example, methyl methacrylate, styrene compounds, acrylonitrile or mixtures thereof. It is also possible to use polymers which comprise acidic and/or basic monomers in copolymerized form.

Suitable anti-dripping agents are, for example, polytetrafluoroethylene (Teflon) polymers and ultra-high molecular weight polystyrene (molar mass Mw over 2 000 000).

Examples of fibrous or pulverulent fillers are carbon fibers or glass fibers in the form of glass fabrics, glass mats or woven roving fibreglass, chopped glass, glass beads and wollastonite, particularly preferably glass fibers. When using glass fibers, these can be equipped with a size and an adhesion promoter for better compatibility with the blend components. The glass fibers can be incorporated either in the form of short glass fibers or in the form of endless strands (rovings).

Suitable particulate fillers are, e.g. carbon black, amorphous silica, magnesium carbonate, powdered quartz, mica, bentonite, talc, feldspar or, in particular, calcium silicates such as wollastonite and kaolin.

Suitable antistatic agents are, for example, amine derivatives such as N,N-bis(hydroxyalkyl)alkylamines or -alkyleneamines, polyethylene glycol esters, copolymers of ethylene oxide glycol and propylene oxide glycol (in particular diblock or triblock copolymers of ethylene oxide and propylene oxide blocks) and glycerol mono- and distearates, and also mixtures thereof.

Suitable stabilizers are, for example, hindered phenols, but also vitamin E or analogous compounds based thereon, as well as butylated condensation products of p-cresol and dicyclopentadiene. HALS stabilizers (Hindered Amine Light Stabilizers), benzophenones, resorcinols, salicylates, benzotriazoles are also suitable. Other suitable compounds are, for example, thiocarboxylic esters.

$C_6$-$C_{20}$-alkyl esters of thiopropionic acid, in particular the stearyl esters and lauryl esters, can also be used. It is also possible to use thiodipropionic acid dilauryl ester (dilauryl thiodipropionate), thiodipropionic acid distearyl ester (distearyl thiodipropionate) or mixtures thereof. Further additives are, for example, HALS absorbers such as bis(2,2,6, 6-tetramethyl-4-piperidyl) sebacate or UV absorbers such as 2H-benzotriazol-2-yl(4-methylphenol). Such additives are usually used in amounts from 0.01 up to 2% by weight (based on the total mixture).

Suitable lubricants and release agents are stearic acids, stearyl alcohol, stearic acid esters, amide waxes (bisstearylamide), polyolefin waxes or generally higher fatty acids, derivatives thereof and corresponding fatty acid mixtures having 12 to 30 carbon atoms. Ethylene bis stearamide (e.g. Irgawax, manufacturer Ciba, Switzerland) is also particularly suitable. The amounts of these additives are in the range from 0.05 to 5% by weight.

Silicone oils, oligomeric isobutylene or similar substances are also suitable as additives. The customary amounts, if used, are from 0.001 to 3% by weight, based on the amount of components A plus B plus K. Pigments, dyes, color brighteners such as ultramarine blue, phthalocyanines, titanium dioxide, cadmium sulfides, derivatives of perylenetetracarboxylic acid can also be used. Processing aids and stabilizers such as UV stabilizers, heat stabilizers (e.g. butylated reaction products of p-cresol and dicyclopentadiene, such as B. Wingstay L; manufacturer: Omnova; or thiodipropionic acid dilauryl ester, Irganox PS 800, manufacturer: BASF), lubricants and antistatic agents (e.g. ethylene oxide-propylene oxide copolymers such as Pluronic (manufacturer: BASF) are used, if used, typically in amounts from 0.01 to 5% by weight, based on the amount of components A plus B plus K.

The individual additives are generally used in the respectively customary amounts.

The molding compositions according to the invention can be produced by all known methods from the components A and B (and optionally further polymers (TP) and components K). Preferably, however, the mixing of the components takes place by melt mixing, for example joint extrusion, kneading or rolling of the components. This is conducted at temperatures in the range from 160 to 400° C., preferably from 180 to 280° C. In a preferred embodiment, the component (B) is first partially or completely isolated from the aqueous dispersion obtained in the respective production steps. For example, the graft copolymers B can be mixed with the matrix polymers as moist or dry crumbs/powders (for example with a residual moisture content of 1 to 40%, in particular 20 to 40%), in which the complete drying of the graft copolymers takes place during the mixing. The particles can also be dried according to DE-A 19907136.

Use of the Graft Copolymers

The invention further relates to the use of the thermoplastic molding composition according to the invention for the production of moldings such as plates or semi-finished products, films, fibers or also of foams, and also the corresponding moldings such as plates, semi-finished products, films, fibers or foams.

The processing can be carried out by means of the known methods of thermoplast processing, in particular the production can be carried out by thermoforming, extrusion, injection molding, calendering, blow molding, compression molding, pressure sintering, deep molding or sintering, preferably by injection molding.

The molding compositions according to the invention have excellent mechanical properties, such as toughness and stiffness. Furthermore, an improved surface gloss was found for the molding compositions according to the invention.

Preferably, the term "comprising" also includes the term "consisting of".

All the abovementioned embodiments and preferred embodiments are freely combinable with each other, unless the context clearly says otherwise.

Further advantageous configurations are illustrated by the figures and explained in the following description. Shown are:

FIG. 1 to FIG. 4: size distribution of the graft copolymers (B) and

Figure 5:
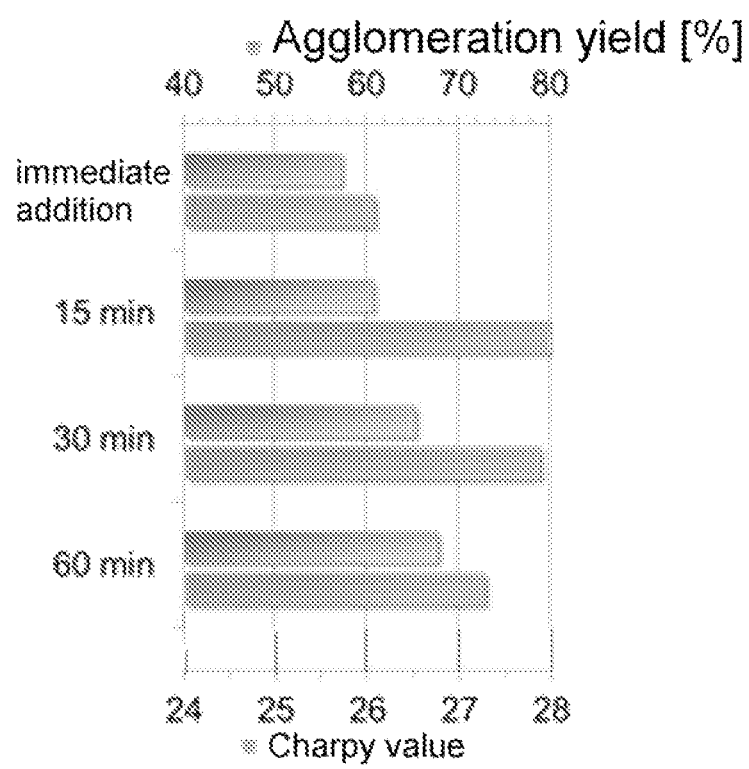

FIG. 5: Charpy notch impact strength of the final molding composition.

The size distributions shown in FIGS. 1 to 4 reflect the corresponding samples after agglomeration and after completion of the grafting, which are described in the examples. FIG. 5 illustrates the Charpy notch impact strength and the agglomeration yield of the final molding composition. The upper bar corresponds to the agglomeration yield. The lower bar corresponds to Charpy notch impact strength.

The invention is to be illustrated by the further examples and claims. Firstly, the test methods used to characterize the polymers are briefly summarized:

a) Charpy notch impact strength [kJ/m$^2$]:

the notch impact strength is determined on test specimens (80×10×4 mm, produced by injection molding at a mass temperature of 240° C. and a mold temperature of 70° C.), at 23° C. according to ISO 179-1A.

b) flowability (MVR [ml/10 min]):

The flowability is determined at a polymer melt at 220° C. and 10 kg loading according to ISO 1133.

c) particle size [nm]:

A disc centrifuge DC 24000 from CPS Instruments Inc. was used to measure the weight-average particle size $d_w$ of the rubber dispersions of the graft core B1 and the agglomerated graft core B1. The measurement was carried out in 17.1 ml of an aqueous sugar solution with a sucrose density gradient of 8 to 20% by weight, in order to achieve a stable flotation behavior of the particles. A polybutadiene latex having a narrow distribution and an average particle size of 405 nm was used for the calibration. The measurements were carried out at a rotational speed of the disk of 24 000 rpm by injecting 0.1 ml of a dilute rubber dispersion (aqueous 24% by weight sucrose solution comprising ca. 0.2 to 2% by weight of rubber particles) into the disk centrifuge containing the aqueous sugar solution with a sucrose density gradient of 8 to 20% by weight.

To measure the weight-average particle size $d_w$ of the copolymer (C) having an agglomerating effect with the DC 24000 disk centrifuge from CPS Instruments Inc., 17.1 ml of an aqueous sugar solution with a sucrose density gradient of 3.5 to 15.5% by weight were used in order to achieve a stable sedimentation behavior of the particles. A polyurethane latex (particle density 1.098 g/ml) having a narrow distribution and an average particle size of 155 nm was used for the calibration. The measurements were carried out at a rotational speed of the disk of 24 000 rpm by injecting 0.1 ml of a dilute dispersion of the copolymer C (prepared by diluting with water up to a content of 1-2% by weight) into the disk centrifuge containing the aqueous sugar solution with a sucrose density gradient of 3.5 to 15.5% by weight.

The solids content after drying the samples were measured at 180° C. for 25 min in a drying cabinet.

d) swelling index SI and gel content [%]:

values for the gel content were determined using the wire cage method in toluene (see Houben-Weyl, Methoden der Organischen Chemie, Makromolekulare Stoffe [Methods in Organic Chemistry, Macromolecular Substances], part 1, page 307 (1961) Thieme Verlag Stuttgart). A film was produced from the aqueous dispersion of the graft core by evaporation of the water. 50 g of toluene was added to 0.2 g of this film. After 24 hours, the toluene was removed from the swollen sample and the sample was weighed. After drying the sample under reduced pressure at 110° C. for 16 hours, the sample was again weighed.

The swelling index is determined by:

$$\text{swelling index } SI = \frac{\text{gel swollen with toluene prior to drying}}{\text{gel after drying}}$$

The gel content is determined by:

$$\text{gel content} = \frac{\text{mass of the sample dried under vacuum}}{\text{weight of the sample prior to swelling}} \times 100\%$$

e) gloss characteristics

To determine the gloss characteristics, rectangular plate with the dimensions 60 mm×40 mm×2 mm are produced from the polymer melt by means of an injection molding machine at a mass temperature of 240° C. and a mold temperature of 70° C. The surface gloss is measured by means of reflection measurement according to DIN 67530 at an angle of 20°.

f) Yellowness Index YI

The YI value was determined on platelets with the dimensions 60×40×2 mm, produced by injection molding at a mass temperature of 240° C. and a mold temperature of 70° C. according to ASTM method E313-96 (light type/observer combination)C/2°).

The invention is elucidated in more detail by the examples and claims.

EXAMPLE 1

1) Production of the Graft Core (B1)

The graft core (B1), such as PB904, is produced by emulsion polymerization of butadiene and styrene by the feed process. 7% by weight styrene are used as comonomer.

The emulsion polymerization is carried out in a 150 L reactor at a temperature of 67° C. 43 120 g of the monomer mixture (butadiene and styrene) are polymerized at 67° C. in the presence of 431.2 g of tert-dodecylmercaptan (TDM), 311 g of potassium stearate, 82 g of potassium persulfate, 147 g of sodium hydrogencarbonate and 58 400 g of water, wherein a latex of the graft core is obtained with a solids content of 41.5% by weight. The monomers are introduced into the reactor in the following sequence:

Firstly, styrene is added in an amount of 7% by weight, based on the total monomer amount, over a period of 20 minutes. Following the styrene addition, a first portion of the butadiene is added in an amount of 7% by weight, based on the total amount of monomer, over a period of 25 minutes. The remaining portion of the butadiene, corresponding to 86% by weight, based on the total monomer amount, is then added over a period of 8.5 hours. TDM is added in one go at the start of the reaction. The polymerization conversion is ≥95%. Further data of the graft core (B1) are described in Table 1:

TABLE 1

| Graft core | | B1 |
|---|---|---|
| Total styrene content | % by weight | 7 |
| Core styrene content | % by weight | 7 |
| Gel content | % by weight | 76.6 |
| SI | | 22 |
| $d_w$ | nm | 100.1 |
| $d_{10}$ | nm | 78.7 |
| $d_{50}$ | nm | 94.2 |
| $d_{90}$ | nm | 103.8 |
| U | | 0.27 |

2) Production of the Copolymer (C) Having an Agglomerating Effect (Inventive)

The copolymer C, such as Agglonal 574, is produced by means of emulsion polymerization.

EXAMPLE 2

The components and amounts of the respective feeds are illustrated in Table 2:

TABLE 2

| | | Amount [g] | Feedstock | Content % | pphm | mol | Volume [l] | Percentage by weight |
|---|---|---|---|---|---|---|---|---|
| Initial charge | 1 | 504.70 | Demin. water | 100.00 | 71.65 | 28.008 | 504.7 | 28.52 |
| | 2 | 0.66 | Emulsifier K 30 | 40.00 | 0.04 | 0.001 | 0.66 | 0.04 |
| Feed 1 | 1 | 1.53 | Sodium peroxodisulfate | 100.00 | 0.22 | 0.006 | 1.53 | 0.09 |
| | 2 | 21.86 | Demin. water | 100.00 | 3.10 | 1.213 | 21.86 | 1.235202712 |
| Feed 2 | 1 | 75.20 | Ethyl acrylate | 100.00 | 10.68 | 0.751 | 75.2 | 4.25 |

TABLE 2-continued

| | | Amount [g] | Feedstock | Content % | pphm | mol | Volume [l] | Percentage by weight |
|---|---|---|---|---|---|---|---|---|
| Feed 3 | 1 | 597.20 | Ethyl acrylate | 100.00 | 84.78 | 5.965 | 597.2 | 33.74 |
| Feed 4 | 1 | 213.60 | Methacrylamide | 15.00 | 4.55 | 0.376 | 213.6 | 12.07 |
| | 2 | 24.70 | Emulsifier K30 | 40.00 | 1.40 | 0.033 | 24.7 | 1.395677356 |
| | 3 | 129.10 | Demin. water | 100.00 | 18.33 | 7.164 | 129.1 | 7.294815652 |
| Feed 5 | 1 | 1.20 | Sodium peroxodisulfate | 100.00 | 0.17 | 0.005 | 1.2 | 0.07 |
| | 2 | 200.00 | Demin. water | 100.00 | 28.39 | 11.099 | 200 | 11.30103122 |

The results are shown in Table 3.

TABLE 3

| | | Conditions | | Measured value | Units |
|---|---|---|---|---|---|
| Final sample | 1 | Particle size | HDC, d(0.1) | 114 | nm |
| | 2 | Particle size | HDC, d(0.5) | 128 | nm |
| | 3 | Particle size | HDC, d(0.9) | 145 | nm |
| | 4 | Solids content | Automat Mettler, 10 h, 200 | 40.1 | % |

Apparatus: 2l four-necked flask with metal stirrer, reflux condenser, N2 inertization, temperature control via water bath with immersion heater, stirrer; 180 rpm Procedure:

The initial charge is inertized and heated to 70° C. On reaching the temperature, feed 1 is metered in over 10 min, 5 min stirring. Feed 2 is started and metered in over 18 min, the temperature is brought from 70 to 80° C. During the feed, observe the start of the experiment. After feeding of feed 2 has ended, feeds 3 and 5 are started and metered in over 3 hours and also the soap of feed 4. Methacrylamide is only metered in after 15 min.

After the feeding had ended, polymerization is continued at 80° C. for 45 min. The batch is brought to room temperature, filtered and filled.

EXAMPLE 3

The components and amounts of the respective feeds are illustrated in Table 4.

TABLE 4

| | | Amount [g] | Feedstock | Content % | pphm | mol | Volume [l] | Percentage by weight |
|---|---|---|---|---|---|---|---|---|
| Initial charge | 1 | 504.70 | Demin. water | 100.00 | 71.65 | 28.008 | 504.7 | 28.51 |
| | 2 | 1.32 | Emulsifier K 30 | 40.00 | 0.07 | 0.002 | 1.32 | 0.07 |
| Feed 1 | 1 | 1.53 | Sodium peroxodisulfate | 100.00 | 0.22 | 0.006 | 1.53 | 0.09 |
| | 2 | 21.86 | Demin. water | 100.00 | 3.10 | 1.213 | 21.86 | 1.234742235 |
| Feed 2 | 1 | 75.20 | Ethyl acrylate | 100.00 | 10.68 | 0.751 | 75.2 | 4.25 |
| Feed 3 | 1 | 597.20 | Ethyl acrylate | 100.00 | 84.78 | 5.965 | 597.2 | 33.73 |
| Feed 4 | 1 | 213.60 | Methacrylamide | 15.00 | 4.55 | 0.376 | 213.6 | 12.07 |
| | 2 | 24.70 | Emulsifier K30 | 40.00 | 1.40 | 0.033 | 24.7 | 1.395157054 |
| | 3 | 129.10 | Demin. water | 100.00 | 18.33 | 7.164 | 129.1 | 7.292096181 |
| Feed 5 | 1 | 1.20 | Sodium peroxodisulfate | 100.00 | 0.17 | 0.005 | 1.2 | 0.07 |
| | 2 | 200.00 | Demin. water | 100.00 | 28.39 | 11.099 | 200 | 11.29681825 |

Results:

TABLE 5

| | | Conditions | | Measured value | Units |
|---|---|---|---|---|---|
| Final sample | 1 | Particle size | HDC, d(0.1) | 92 | nm |
| | 2 | Particle size | HDC, d(0.5) | 105 | nm |
| | 3 | Particle size | HDC, d(0.9) | 120 | nm |
| | 4 | Solids content | Automat Mettler, 10 h, 200 | 40.3 | % |

Apparatus: 2l four-necked flask with metal stirrer, reflux condenser, N2 inertization, temperature control via water bath with immersion heater, stirrer; 180 rpm Procedure:

The initial charge is inertized and heated to 70° C. On reaching the temperature, feed 1 is metered in over 10 min, 5 min stirring. Feed 2 is started and metered in over 18 min, the temperature is brought from 70 to 80° C. During the feed, observe the start of the experiment. After feeding of feed 2 had ended, feeds 3/4 and 5 are started and metered in over 3 hours.

After the feeding had ended, polymerization is continued at 80° C. for 45 min. The batch is brought to room temperature, filtered and filled.

EXAMPLE 4

The components and amounts of the respective feeds are illustrated in Table 6.

TABLE 6

|  |  | Amount [g] | Feedstock | Content % | pphm | mol | Volume [l] | Percentage by weight |
|---|---|---|---|---|---|---|---|---|
| Initial | 1 | 504.70 | Demin. water | 100.00 | 71.65 | 28.008 | 504.7 | 28.52 |
| charge | 2 | 0.66 | Emulsifier K 30 | 40.00 | 0.04 | 0.001 | 0.66 | 0.04 |
| Feed 1 | 1 | 1.53 | Sodium peroxodisulfate | 100.00 | 0.22 | 0.006 | 1.53 | 0.09 |
|  | 2 | 21.86 | Demin. water | 100.00 | 3.10 | 1.213 | 21.86 | 1.235202712 |
| Feed 2 | 1 | 75.20 | Ethyl acrylate | 100.00 | 10.68 | 0.751 | 75.2 | 4.25 |
| Feed 3 | 1 | 597.20 | Ethyl acrylate | 100.00 | 84.78 | 5.965 | 597.2 | 33.74 |
| Feed 4 | 1 | 213.60 | Methacrylamide | 15.00 | 4.55 | 0.376 | 213.6 | 12.07 |
|  | 2 | 24.70 | Emulsifier K30 | 40.00 | 1.40 | 0.033 | 24.7 | 1.395677356 |
|  | 3 | 129.10 | Demin. water | 100.00 | 18.33 | 7.164 | 129.1 | 7.294815652 |
| Feed 5 | 1 | 1.20 | Sodium peroxodisulfate | 100.00 | 0.17 | 0.005 | 1.2 | 0.07 |
|  | 2 | 200.00 | Demin. water | 100.00 | 28.39 | 11.099 | 200 | 11.30103122 |

Results:

TABLE 7

|  |  | Conditions | Measured value | Units |
|---|---|---|---|---|
| Final sample | 1 | Particle size HDC, d(0.1) | 108 | nm |
|  | 2 | Particle size HDC, d(0.5) | 122 | nm |
|  | 3 | Particle size HDC, d(0.9) | 138 | nm |
|  | 4 | Solids content Automat Mettler, 10 h, 200 | 40 | % |

Apparatus: 2l four-necked flask with metal stirrer, reflux condenser, N2 inertization, temperature control via water bath with immersion heater, stirrer; 180 rpm Procedure:

The initial charge is inertized and heated to 70° C. On reaching the temperature, feed 1 is metered in over 10 min, 5 min stirring. Feed 2 is started and metered in over 18 min, the temperature is brought from 70 to 80° C. During the feed, observe the start of the experiment. After feeding of feed 2 had ended, feeds 3 and 5 are started and metered in over 3 hours and also the soap of feed 4. Methacrylamide is only metered in after 60 min.

After the feeding had ended, polymerization is continued at 80° C. for 45 min. The batch is brought to room temperature, filtered and filled.

EXAMPLE 5

The components and amounts of the respective feeds are illustrated in Table 8.

TABLE 8

|  |  | Amount [g] | Feedstock | Content % | pphm | mol | Volume [l] | Percentage by weight |
|---|---|---|---|---|---|---|---|---|
| Initial | 1 | 504.70 | Demin. water | 100.00 | 71.65 | 28.008 | 504.7 | 28.52 |
| charge | 2 | 0.66 | Emulsifier K 30 | 40.00 | 0.04 | 0.001 | 0.66 | 0.04 |
| Feed 1 | 1 | 1.53 | Sodium peroxodisulfate | 100.00 | 0.22 | 0.006 | 1.53 | 0.09 |
|  | 2 | 21.86 | Demin. water | 100.00 | 3.10 | 1.213 | 21.86 | 1.235202712 |
| Feed 2 | 1 | 75.20 | Ethyl acrylate | 100.00 | 10.68 | 0.751 | 75.2 | 4.25 |
| Feed 3 | 1 | 597.20 | Ethyl acrylate | 100.00 | 84.78 | 5.965 | 597.2 | 33.74 |
| Feed 4 | 1 | 213.60 | Methacrylamide | 15.00 | 4.55 | 0.376 | 213.6 | 12.07 |
|  | 2 | 24.70 | Emulsifier K30 | 40.00 | 1.40 | 0.033 | 24.7 | 1.395677356 |
|  | 3 | 129.10 | Demin. water | 100.00 | 18.33 | 7.164 | 129.1 | 7.294815652 |
| Feed 5 | 1 | 1.20 | Sodium peroxodisulfate | 100.00 | 0.17 | 0.005 | 1.2 | 0.07 |
|  | 2 | 200.00 | Demin. water | 100.00 | 28.39 | 11.099 | 200 | 11.30103122 |

Results:
Table 9

TABLE 9

|  |  | Conditions | Measured value | Units |
|---|---|---|---|---|
| Final sample | 1 | Particle size | HDC, d(0.1) | 109 | nm |
|  | 2 | Particle size | HDC, d(0.5) | 123 | nm |
|  | 3 | Particle size | HDC, d(0.9) | 138 | nm |
|  | 4 | Solids content | Automat Mettler, 10 h, 200 | 39.7 | % |

Apparatus: 2l four-necked flask with metal stirrer, reflux condenser, N2 inertization, temperature control via water bath with immersion heater, stirrer; 180 rpm.

Procedure:

The initial charge is inertized and heated to 70° C. On reaching the temperature, feed 1 is metered in over 10 min, 5 min stirring. Feed 2 is started and metered in over 18 min, the temperature is brought from 70 to 80° C. During the feed, observe the start of the experiment. After feeding of feed 2 had ended, feeds 3 and 5 are started and metered in over 3 hours and also the soap of feed 4. Methacrylamide is only metered in after 30 min.

After the feeding had ended, polymerization is continued at 80° C. for 45 min. The batch is brought to room temperature, filtered and filled.

3) Production of the Agglomerated Graft Core (B1)

General Procedure:

Firstly, the latex of the graft core (B1) (see Example 1) is charged and stirred. The latex of the copolymer (C) having an agglomerating effect (Examples 1 to 4) is diluted with demineralized water (demin. water). This diluted latex is then added with stirring for the agglomeration of the graft core (B1).

Subsequently, potassium stearate, dissolved in demineralized water, is added to the agglomerated latex of the graft core (B1) with continued stirring.

The particle size distribution of the agglomerated graft core (B1) is measured. Only a fraction of the particles in the latex of the graft core (B1) is agglomerated into larger particles.

4) Production of the Graft Copolymer (B)

General Procedure:

After completion of the agglomeration step, potassium persulfate, dissolved in parts by weight in demineralized water, is added to the agglomerated latex of the graft core (B1) with continued stirring. A monomer mixture of styrene and acrylonitrile is added over, while stirring is continued. Within this period of the feed of the styrene/acrylonitrile mixture, the temperature can be increased. After completion of the feed of the styrene/acrylonitrile mixture, potassium persulfate, dissolved in demineralized water, is added with continued stirring. The polymerization is continued and the resulting latex of the graft copolymer (B) is cooled to ambient temperature.

A dispersion of a stabilizer is added to the resulting graft copolymer latex (comprising the graft copolymer (B1)) and then precipitated with a magnesium sulfate solution. After filtration of the graft copolymer, the precipitate is washed twice with demineralized water and dried in the drying cabinet to a residual moisture content of less than 1% by weight.

EXAMPLE 6

The components and amounts of the respective feeds are illustrated in Table 10.

A polybutadiene dispersion is used in the following examples.

TABLE 10

|  |  | Amount [g] | Feedstock | Content % | pphm | mol | Volume [l] | Percentage by weight |
|---|---|---|---|---|---|---|---|---|
| Initial charge | 1 | 4350.23 | PB 904 Dispersion | 43.40 | 143.90 |  | 4.35 | 53.95 |
|  | 2 | 369.77 | Demin. water | 100.00 | 28.18 | 20.52 | 0.37 | 4.59 |
| Feed 1 | 1 | 109.38 | Agglonal 574 | 39.70 | 3.31 |  | 0.11 | 1.36 |
|  | 2 | 324.86 | Demin. water | 100.00 | 24.76 | 18.03 | 0.32 | 4.03 |
| Addition 1 | 1 | 1311.10 | Demin. water | 100.00 | 99.93 | 72.76 | 1.31 | 16.26 |
|  | 2 | 17.94 | Potassium stearate | 100.00 | 1.37 |  | 0.02 | 0.22 |
| Addition 2 | 1 | 100.00 | Demin. water | 100.00 | 7.62 | 5.55 | 0.10 | 1.24 |
|  | 2 | 2.36 | Potassium peroxodisulfate | 100.00 | 0.18 | 0.01 | 0.00 | 0.03 |
| Feed 2a | 1 | 262.40 | Styrene | 100.00 | 20.00 | 2.52 | 0.26 | 3.25 |
|  | 2 | 65.60 | Acrylonitrile | 100.00 | 5.00 | 1.24 | 0.07 | 0.81 |
| Feed 2b | 1 | 787.20 | Styrene | 100.00 | 60.00 | 7.56 | 0.79 | 9.76 |
|  | 2 | 196.80 | Acrylonitrile | 100.00 | 15.00 | 3.71 | 0.20 | 2.44 |
| Addition 3 | 1 | 100.00 | Demin. water | 100.00 | 7.62 | 5.55 | 0.10 | 1.24 |
|  | 2 | 2.36 | Potassium peroxodisulfate | 100.00 | 0.18 | 0.01 | 0.00 | 0.03 |
| Addition 4 | 1 | 64.00 | Wingstay L | 10.00 | 0.49 |  | 0.06 | 0.79 |

Two samples are measured in each case.

TABLE 11

| Sample name | Sample description |
|---|---|
| P1 | GM 28/01 | After addition 1 |
| P2 | GM 28 | Final sample |

The physical measured values are shown in Table 12.

TABLE 12

|  |  | Conditions | Measured value | Units | Remark |
|---|---|---|---|---|---|
| P1 | 1 | Particle size | HDC, d(0.1) | 82 | nm | Peak 1 |
|  | 2 | Particle size | HDC, d(0.5) | 96 | nm | Peak 1 |
|  | 3 | Particle size | HDC, d(0.9) | 111 | nm | Peak 1 |
|  | 4 | Particle size | HDC, d(0.1) | 452 | nm | Peak 2 |
|  | 5 | Particle size | HDC, d(0.5) | 492 | nm | Peak 2 |
|  | 6 | Particle size | HDC, d(0.9) | 537 | nm | Peak 2 |

TABLE 12-continued

|   |   |   | Conditions | Measured value | Units | Remark |
|---|---|---|---|---|---|---|
|   | 7 | Solids content | Automat Mettler, 200° C. | 29.6 | % |   |
|   | 9 | Content | GC, Styrene |   | ppm |   |
|   | 10 | Content | GC, Acrylonitrile |   | ppm |   |
|   | 11 | Content | GC, Butadiene |   | ppm |   |
|   | 12 | Content | GC, Ethyl benzene |   | ppm |   |
| P2 | 1 | Particle size | HDC, d(0.1) | 112 | nm | Peak 1 |
|   | 2 | Particle size | HDC, d(0.5) | 128 | nm | Peak 1 |
|   | 3 | Particle size | HDC, d(0.9) | 145 | nm | Peak 1 |
|   | 4 | Particle size | HDC, d(0.1) | 417 | nm | Peak 2 |
|   | 5 | Particle size | HDC, d(0.5) | 451 | nm | Peak 2 |
|   | 6 | Particle size | HDC, d(0.9) | 490 | nm | Peak 2 |
|   | 7 | Solids content | Automat Mettler, 200° C. | 40.5 | % |   |
|   | 8 | Coagulate | in the filter | 31 | g |   |
|   | 9 | Content | GC, Styrene |   | ppm |   |
|   | 10 | Content | GC, Acrylonitrile |   | ppm |   |
|   | 11 | Content | GC, Butadiene |   | ppm |   |
|   | 12 | Content | GC, Ethyl benzene |   | ppm |   |

Procedure:

Initial charge is stirred at 180 rpm and heated to 68° C. Feed 1 is started and metered in over 25 min. Stirring is then continued for 5 min. During the agglomeration, the rotational speed remains at 180 rpm. Then addition 1 and then take sample, ca. 10 ml.

Then addition 2 and change rotational speed to 220 rpm. Start feed 2a and meter in at 68° C. over 34 min. Then polymerize for 10 min. Feed 2b is metered in over 120 min. During the feed, the temperature is allowed to increase linearly from 68° C. to 80° C. After feeding, addition 3 is carried out. Test is post-polymerized at 80° C. for 60 min. Cool batch and addition 4.

FIG. 1 shows the size distribution of the sample after addition 1 (GM 28/01) and the final sample (GM 28).

EXAMPLE 7

The components and amounts of the respective feeds are illustrated in Table 13.

TABLE 13

|   |   | Amount [g] | Feedstock | Content % | pphm | mol | Volume [l] | Percentage by weight |
|---|---|---|---|---|---|---|---|---|
| Initial charge | 1 | 4350.23 | PB 904 Dispersion | 43.40 | 143.90 |   | 4.35 | 53.95 |
|   | 2 | 369.77 | Demin. water | 100.00 | 28.18 | 20.52 | 0.37 | 4.59 |
| Feed 1 | 1 | 108.56 | Agglonal 574 | 40.00 | 3.31 |   | 0.11 | 1.35 |
|   | 2 | 325.68 | Demin. water | 100.00 | 24.82 | 18.07 | 0.33 | 4.04 |
| Addition 1 | 1 | 1311.10 | Demin. water | 100.00 | 99.93 | 72.76 | 1.31 | 16.26 |
|   | 2 | 17.94 | Potassium stearate | 100.00 | 1.37 |   | 0.02 | 0.22 |
| Addition 2 | 1 | 100.00 | Demin. water | 100.00 | 7.62 | 5.55 | 0.10 | 1.24 |
|   | 2 | 2.36 | Potassium peroxodisulfate | 100.00 | 0.18 | 0.01 | 0.00 | 0.03 |
| Feed 2a | 1 | 262.40 | Styrene | 100.00 | 20.00 | 2.52 | 0.26 | 3.25 |
|   | 2 | 65.60 | Acrylonitrile | 100.00 | 5.00 | 1.24 | 0.07 | 0.81 |
| Feed 2b | 1 | 787.20 | Styrene | 100.00 | 60.00 | 7.56 | 0.79 | 9.76 |
|   | 2 | 196.80 | Acrylonitrile | 100.00 | 15.00 | 3.71 | 0.20 | 2.44 |
| Addition 3 | 1 | 100.00 | Demin. water | 100.00 | 7.62 | 5.55 | 0.10 | 1.24 |
|   | 2 | 2.36 | Potassium peroxodisulfate | 100.00 | 0.18 | 0.01 | 0.00 | 0.03 |
| Addition 4 | 1 | 64.00 | Wingstay L | 10.00 | 0.49 |   | 0.06 | 0.79 |

Two samples are measured in each case.

TABLE 14

| Sample name | | Sample description |
|---|---|---|
| P1 | GM 29/01 | After addition 1 |
| P2 | GM 29 | Final sample |

The physical measured values are shown in Table 15.

TABLE 15

|   |   |   | Conditions | Measured value | Units | Remark |
|---|---|---|---|---|---|---|
| P1 | 1 | Particle size | HDC, d(0.1) | 82 | nm | Peak 1 |
|   | 2 | Particle size | HDC, d(0.5) | 96 | nm | Peak 1 |
|   | 3 | Particle size | HDC, d(0.9) | 111 | nm | Peak 1 |
|   | 4 | Particle size | HDC, d(0.1) | 460 | nm | Peak 2 |
|   | 5 | Particle size | HDC, d(0.5) | 502 | nm | Peak 2 |
|   | 6 | Particle size | HDC, d(0.9) | 555 | nm | Peak 2 |
|   | 7 | Solids content | Automat Mettler, 200° C. |   | % |   |
|   | 9 | Content | GC, Styrene |   | ppm |   |
|   | 10 | Content | GC, Acrylonitrile |   | ppm |   |
|   | 11 | Content | GC, Butadiene |   | ppm |   |
|   | 12 | Content | GC, Ethyl benzene |   | ppm |   |
| P2 | 1 | Particle size | HDC, d(0.1) | 115 | nm | Peak 1 |
|   | 2 | Particle size | HDC, d(0.5) | 131 | nm | Peak 1 |
|   | 3 | Particle size | HDC, d(0.9) | 149 | nm | Peak 1 |
|   | 4 | Particle size | HDC, d(0.1) | 412 | nm | Peak 2 |
|   | 5 | Particle size | HDC, d(0.5) | 448 | nm | Peak 2 |
|   | 6 | Particle size | HDC, d(0.9) | 490 | nm | Peak 2 |
|   | 7 | Solids content | Automat Mettler, 200° C. | 39 | % |   |
|   | 8 | Coagulate | in the filter | 54 | g |   |
|   | 9 | Content | GC, Styrene |   | ppm |   |
|   | 10 | Content | GC, Acrylonitrile |   | ppm |   |
|   | 11 | Content | GC, Butadiene |   | ppm |   |
|   | 12 | Content | GC, Ethyl benzene |   | ppm |   |

Procedure:

Initial charge is stirred at 180 rpm and heated to 68° C. Feed 1 is started and metered in over 25 min. Stirring is then continued for 5 min. During the agglomeration, the rotational speed remains at 180 rpm. After, addition 1 and then sample is taken, ca. 10 ml. Then addition 2 and change rotational speed to 220 rpm. Start feed 2a and meter in at 68° C. over 34 min. Then polymerize for 10 min. Feed 2b is metered in over 120 min. During the feed, the temperature is allowed to increase linearly from 68° C. to 80° C. After feeding, addition 3 is carried out. Test is post-polymerized at 80° C. for 60 min. Cool batch and addition 4.

Figure 2:
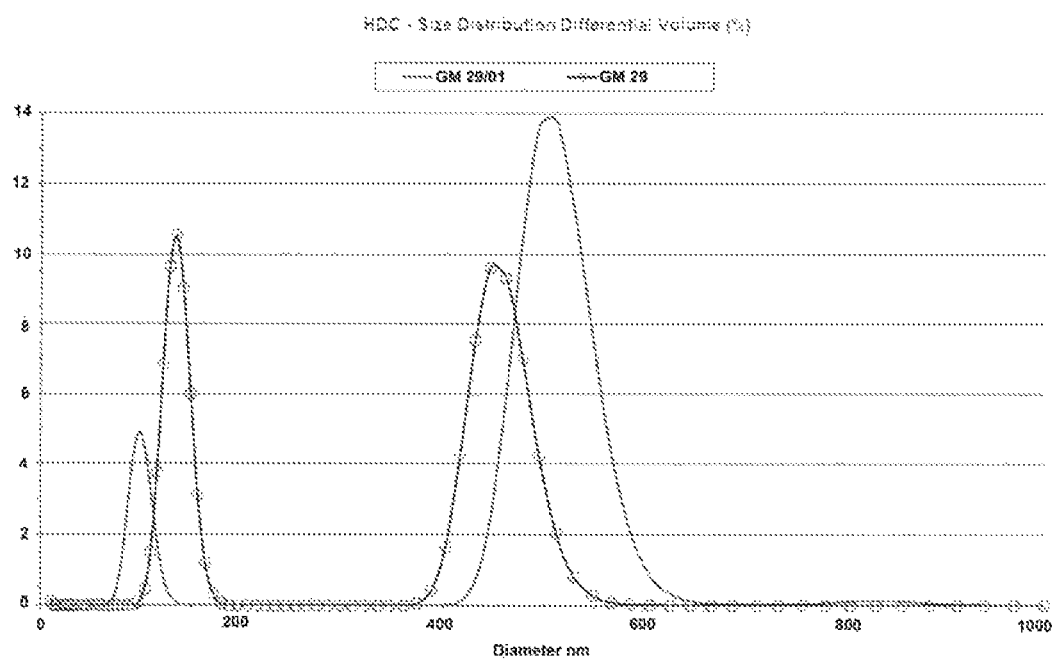

FIG. 2 shows the size distribution of the sample after addition 1 (GM 29/01) and the final sample (GM 29).

EXAMPLE 8

The components and amounts of the respective feeds are illustrated in Table 16.

TABLE 16

| | | Amount [g] | Feedstock | Content % | pphm | mol | Volume [l] | Percentage by weight |
|---|---|---|---|---|---|---|---|---|
| Initial charge | 1 | 4350.23 | PB 904 Dispersion | 43.40 | 143.90 | | 4.35 | 53.95 |
| | 2 | 369.77 | Demin. water | 100.00 | 28.18 | 20.52 | 0.37 | 4.59 |
| Feed 1 | 1 | 107.75 | Agglonal 574 | 40.30 | 3.31 | | 0.11 | 1.34 |
| | 2 | 326.49 | Demin. water | 100.00 | 24.88 | 18.12 | 0.33 | 4.05 |
| Addition 1 | 1 | 1311.10 | Demin. water | 100.00 | 99.93 | 72.76 | 1.31 | 16.26 |
| | 2 | 17.94 | Potassium stearate | 100.00 | 1.37 | | 0.02 | 0.22 |
| Addition 2 | 1 | 100.00 | Demin. water | 100.00 | 7.62 | 5.55 | 0.10 | 1.24 |
| | 2 | 2.36 | Potassium peroxodisulfate | 100.00 | 0.18 | 0.01 | 0.00 | 0.03 |
| Feed 2a | 1 | 262.40 | Styrene | 100.00 | 20.00 | 2.52 | 0.26 | 3.25 |
| | 2 | 65.60 | Acrylonitrile | 100.00 | 5.00 | 1.24 | 0.07 | 0.81 |
| Feed 2b | 1 | 787.20 | Styrene | 100.00 | 60.00 | 7.56 | 0.79 | 9.76 |
| | 2 | 196.80 | Acrylonitrile | 100.00 | 15.00 | 3.71 | 0.20 | 2.44 |
| Addition 3 | 1 | 100.00 | Demin. water | 100.00 | 7.62 | 5.55 | 0.10 | 1.24 |
| | 2 | 2.36 | Potassium peroxodisulfate | 100.00 | 0.18 | 0.01 | 0.00 | 0.03 |
| Addition 4 | 1 | 64.00 | Wingstay L | 10.00 | 0.49 | | 0.06 | 0.79 |

Two samples are measured in each case.

TABLE 17

| | Sample name | Sample description |
|---|---|---|
| P1 | GM 35/01 | After addition 1 |
| P2 | GM 35 | Final sample |

The physical measured results are shown in Table 18.

TABLE 18

| | | Conditions | Measured value | Units | Remark |
|---|---|---|---|---|---|
| P1 | 1 Particle size | HDC, d(0.1) | 83 | nm | Peak 1 |
| | 2 Particle size | HDC, d(0.5) | 97 | nm | Peak 1 |
| | 3 Particle size | HDC, d(0.9) | 112 | nm | Peak 1 |
| | 4 Particle size | HDC, d(0.1) | 374 | nm | Peak 2 |
| | 5 Particle size | HDC, d(0.5) | 413 | nm | Peak 2 |
| | 6 Particle size | HDC, d(0.9) | 457 | nm | Peak 2 |
| | 7 Solids content | Automat Mettler, 200° C. | 29.7 | % | |
| | 9 Content | GC, Styrene | | ppm | |
| | 10 Content | GC, Acrylonitrile | | ppm | |
| | 11 Content | GC, Butadiene | | ppm | |
| | 12 Content | GC, Ethyl benzene | | ppm | |
| P2 | 1 Particle size | HDC, d(0.1) | 113 | nm | Peak 1 |
| | 2 Particle size | HDC, d(0.5) | 129 | nm | Peak 1 |
| | 3 Particle size | HDC, d(0.9) | 146 | nm | Peak 1 |
| | 4 Particle size | HDC, d(0.1) | 352 | nm | Peak 2 |
| | 5 Particle size | HDC, d(0.5) | 384 | nm | Peak 2 |
| | 6 Particle size | HDC, d(0.9) | 420 | nm | Peak 2 |
| | 7 Solids content | Automat Mettler, 200° C. | 39.4 | % | |
| | 8 Coagulate | in the filter | 32 | g | |
| | 9 Content | GC, Styrene | | ppm | |
| | 10 Content | GC, Acrylonitrile | | ppm | |
| | 11 Content | GC, Butadiene | | ppm | |
| | 12 Content | GC, Ethyl benzene | | ppm | |

Procedure:

Initial charge is stirred at 180 rpm and heated to 68° C. Feed 1 is started and metered in over 25 min. Stirring is then continued for 5 min. During the agglomeration, the rotational speed remains at 180 rpm. Then addition 1 and then take sample, ca. 10 ml. Then addition 2 and change rotational speed to 220 rpm. Start feed 2a and meter in at 68° C. over 34 min. Then polymerize for 10 min. Feed 2b is metered in over 120 min. During the feed, the temperature is allowed to increase linearly from 68° C. to 80° C. After feeding, addition 3 is carried out. Test is post-polymerized at 80° C. for 60 min. Cool batch and addition 4.

Figure 3:
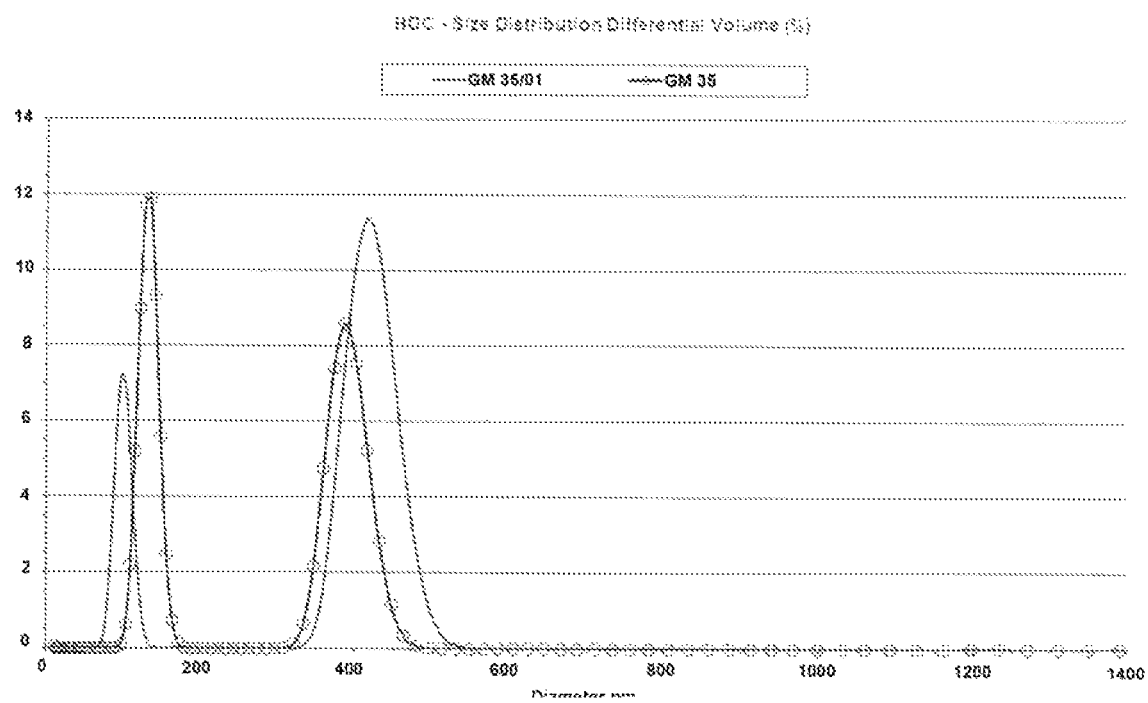

FIG. 3 shows the size distribution of the sample after addition 1 (GM 35/01) and the final sample (GM 35).

EXAMPLE 9

The components and amounts of the respective feeds are illustrated in Table 19.

TABLE 19

|  |  | Amount [g] | Feedstock | Content % | pphm | mol | Volume [l] | Percentage by weight |
|---|---|---|---|---|---|---|---|---|
| Initial charge | 1 | 4350.23 | PB 904 Dispersion | 43.40 | 143.90 |  | 4.35 | 53.95 |
|  | 2 | 369.77 | Demin. water | 100.00 | 28.18 | 20.52 | 0.37 | 4.59 |
| Feed 1 | 1 | 108.29 | Agglonal 574 | 40.10 | 3.31 |  | 0.11 | 1.34 |
|  | 2 | 325.95 | Demin. water | 100.00 | 24.84 | 18.09 | 0.33 | 4.04 |
| Addition 1 | 1 | 1311.10 | Demin. water | 100.00 | 99.93 | 72.76 | 1.31 | 16.26 |
|  | 2 | 17.94 | Potassium stearate | 100.00 | 1.37 |  | 0.02 | 0.22 |
| Addition 2 | 1 | 100.00 | Demin. water | 100.00 | 7.62 | 5.55 | 0.10 | 1.24 |
|  | 2 | 2.36 | Potassium peroxodisulfate | 100.00 | 0.18 | 0.01 | 0.00 | 0.03 |
| Feed 2a | 1 | 262.40 | Styrene | 100.00 | 20.00 | 2.52 | 0.26 | 3.25 |
|  | 2 | 65.60 | Acrylonitrile | 100.00 | 5.00 | 1.24 | 0.07 | 0.81 |
| Feed 2b | 1 | 787.20 | Styrene | 100.00 | 60.00 | 7.56 | 0.79 | 9.76 |
|  | 2 | 196.80 | Acrylonitrile | 100.00 | 15.00 | 3.71 | 0.20 | 2.44 |
| Addition 3 | 1 | 100.00 | Demin. water | 100.00 | 7.62 | 5.55 | 0.10 | 1.24 |
|  | 2 | 2.36 | Potassium peroxodisulfate | 100.00 | 0.18 | 0.01 | 0.00 | 0.03 |
| Addition 4 | 1 | 64.00 | Wingstay L | 10.00 | 0.49 |  | 0.06 | 0.79 |

Two samples are measured in each case.

TABLE 20

| Sample name | Sample description |
|---|---|
| P1  GM 37/01 | After addition 1 |
| P2  GM 37 | Final sample |

The physical measured results are shown in Table 21.

TABLE 21

|  |  | Conditions | Measured value | Units | Remark |
|---|---|---|---|---|---|
| P1 | 1 | Particle size | HDC, d(0.1) | 83 | nm | Peak 1 |
|  | 2 | Particle size | HDC, d(0.5) | 98 | nm | Peak 1 |
|  | 3 | Particle size | HDC, d(0.9) | 114 | nm | Peak 1 |
|  | 4 | Particle size | HDC, d(0.1) | 445 | nm | Peak 2 |
|  | 5 | Particle size | HDC, d(0.5) | 485 | nm | Peak 2 |
|  | 6 | Particle size | HDC, d(0.9) | 533 | nm | Peak 2 |
|  | 7 | Solids content | Automat Mettler, 200° C. | 30.7 | % |  |
| P2 | 1 | Particle size | HDC, d(0.1) | 109 | nm | Peak 1 |
|  | 2 | Particle size | HDC, d(0.5) | 125 | nm | Peak 1 |
|  | 3 | Particle size | HDC, d(0.9) | 144 | nm | Peak 1 |
|  | 4 | Particle size | HDC, d(0.1) | 403 | nm | Peak 2 |
|  | 5 | Particle size | HDC, d(0.5) | 439 | nm | Peak 2 |
|  | 6 | Particle size | HDC, d(0.9) | 481 | nm | Peak 2 |
|  | 7 | Solids content | Automat Mettler, 200° C. | 39.7 | % |  |
|  | 8 | Coagulate | in the filter | 19 | g |  |

Procedure:

Initial charge is stirred at 180 rpm and heated to 68° C. Feed 1 is started and metered in over 25 min. Stirring is then continued for 5 min. During the agglomeration, the rotational speed remains at 180 rpm. Then addition 1 and then take sample, ca. 10 ml. Then addition 2 and change rotational speed to 220 rpm. Start feed 2a and meter in at 68° C. over 34 min. Then polymerize for 10 min. Feed 2b is metered in over 120 min. During the feed, the temperature is allowed to increase linearly from 68° C. to 80° C. After feeding, addition 3 is carried out. Test is post-polymerized at 80° C. for 60 min. Cool batch and addition 4.

Figure 4:
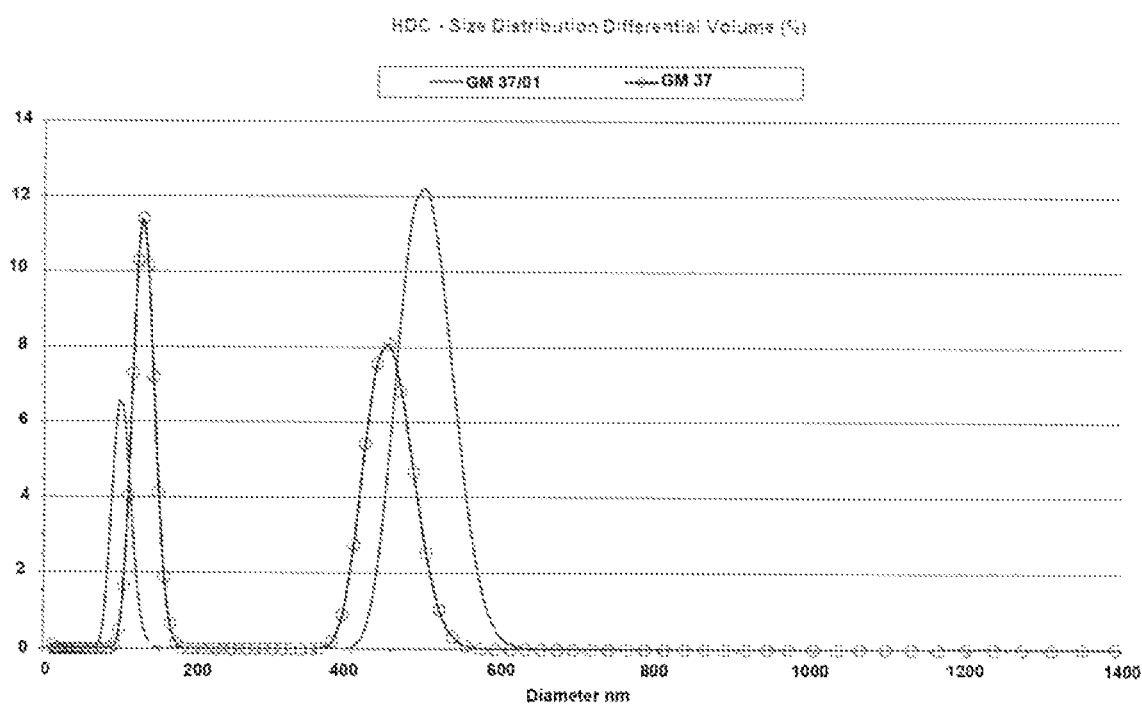

FIG. 4 shows the size distribution of the sample after addition 1 (GM 37/01) and the final sample (GM 37).

5) Thermoplastic Molding Compositions of SAN Polymer and Graft Copolymer B

Thermoplastic Copolymer A Used

The SAN polymer used was: statistical copolymer of styrene and acrylonitrile, produced by free-radical solution polymerization, with a ratio of styrene to acrylonitrile of 75:25 having a viscosity number of 64 ml/g (concentration 5 g/l measured at 20° C. in dimethylformamide) and a melt volume flow rate MVR of 64 [ml/10 min], measured at 220° C. and 10 kg loading according to ISO 1133.

Additives D Used:

silicone oil: polydimethylsiloxane having a kinematic viscosity of 30 000 mm$^2$/s The SAN polymer and an aforementioned graft copolymer (B) are mixed in a twin-screw extruder having a shaft diameter of 25 mm. In the extrusion zone, the temperature was adjusted to 200 to 250° C. and the processing was conducted at 700 rpm of the twin-screw extruder. The batch size for all examples was 4 kg.

Using the resulting ABS molding compositions, test were conducted to determine the flowability (MVR), the Charpy notch impact strength, the yellowness index (YI), and the surface gloss. The test methods listed above were applied.

The corresponding physical properties of the molding composition according to the invention can be found in Tables 22 and 23 below.

TABLE 22

| Delayed addition (MAM feed) | Charpy IZOD RT [kJ/m$^2$] | Charpy IZOD −20° C. [kJ/m$^2$] | MVR [mL/10 min] | Hardness Hc 30" | Yellowness Index | Surface gloss 20° | Particle size (aggl. fraction) | U (aggl. fraction) |
|---|---|---|---|---|---|---|---|---|
| no time delay | 26.1 | 10.5 | 9.3 | 105 | 20.8 | 77 | 438 | 0.18 |
| 15 min. | 28.1 | 11.7 | 8.6 | 104 | 17.4 | 91 | 442 | 0.18 |

TABLE 22-continued

| Delayed addition (MAM feed) | Charpy IZOD RT [kJ/m²] | Charpy IZOD −20° C. [kJ/m²] | MVR [mL/10 min] | Hardness Hc 30" | Yellowness Index | Surface gloss 20° | Particle size (aggl. fraction) | U (aggl. fraction) |
|---|---|---|---|---|---|---|---|---|
| 30 min. | 27.9 | 11.8 | 9.0 | 103 | 19.3 | 89 | 457 | 0.17 |
| 60 min. | 27.3 | 11.4 | 9.6 | 104 | 17.9 | 90 | 456 | 0.17 |

TABLE 23

| Delayed addition MAM feed | Penetration (WT/J) | Rubber content [%] |
|---|---|---|
| no time delay | 22.6 | 34.6 |
| 15 min. | 24.2 | 36.5 |
| 30 min. | 24.7 | 35.3 |
| 60 min. | 18.4 | 32.9 |

The data from Tables 22 and 23 show that the ABS molding compositions according to the invention comprising a graft polymer (B) according to the invention have very good notch impact strength and also significantly improved surface gloss.

FIG. 5 illustrates the Charpy notch impact strength of the final molding composition. Various moldings, films and coatings can be produced from this molding composition.

The invention claimed is:

1. A process for preparing a graft copolymer (B) composed of:
(B1): an agglomerated graft core and
(B2): a graft shell,
comprising the steps of:
(I) polymerizing a vinylaromatic component (B11), a diene component (B12) or mixtures of the vinylaromatic component (B11) and the diene component (B12), in aqueous emulsion to prepare a graft core (B1a),
(II) agglomerating the graft core (B1a) obtained in (I), by adding 0.01 to 5 parts by weight, based on 100 parts by weight of the graft core (B1a), based in each case on the solids content, of at least one copolymer (C) having an agglomerating effect to prepare the graft core (B1), and subsequently
(III) polymerizing at least one ethylenically unsaturated monomer (B20), wherein (B20) comprises a mixture of the monomers (B21) and (B22), to give a graft shell in aqueous emulsion in the presence of the agglomerated graft core (B1),
wherein the copolymer (C) having an agglomerating effect is obtained by
i) polymerizing (C1): 80 to 99.9% by weight of one or more hydrophobic $C_1$- to $C_{12}$-alkyl acrylates or $C_1$- to $C_{12}$-alkyl methacrylates,
ii) adding at least one emulsifier (E),
iii) adding and polymerizing (C2): 0.1 to 20% by weight of one or more hydrophilic comonomers selected from the group consisting of acrylamide, methylacrylamide, ethylacrylamide and n-butylacrylamide,
wherein (C1) and (C2) add up to 100% by weight,
wherein the addition of (C2) is carried out after the addition of (E) in step ii).

2. The process for preparing a graft copolymer (B) as claimed in claim 1, composed of:
(B1): 40 to 85% by weight, based on the solids content of the graft copolymer (B), of an agglomerated graft core (B1), composed of a graft core (B1a), wherein (B1) is obtained by
(a) polymerizing at least one ethylenically unsaturated monomer (B10) to give a graft core (B1a), and
(b) agglomeration of the graft core (B1a) obtained in (a) by adding 0.01 to 5 parts by weight, based on 100 parts by weight of the graft core (B1a), based in each case on the solids content, of at least one copolymer (C) having an agglomerating effect, to obtain (B1),
(B2): 15 to 60% by weight, based on the solids content of the graft copolymer (B), of a graft shell composed of at least one ethylenically unsaturated monomer (B20), obtained by reacting the agglomerated graft core (B1) with the at least one ethylenically unsaturated monomer (B20),
wherein the sum total of graft core (B1) and graft shell (B2) adds up to 100% by weight,
wherein the at least one copolymer (C) having an agglomerating effect is obtained by:
i) polymerizing (C1): 80 to 99.9% by weight of one or more hydrophobic $C_1$- to $C_{12}$-alkyl acrylates or $C_1$- to $C_{12}$-alkyl methacrylates,
ii) adding an emulsifier (E),
iii) adding and polymerizing (C2): 0.1 to 20% by weight of one or more hydrophilic comonomers selected from the group consisting of acrylamide, methylacrylamide, ethylacrylamide and n-butylacrylamide,
wherein (C1) and (C2) add up to 100% by weight,
wherein the addition of (C2) is carried out 2 to 100 min after the addition of (E) in step ii).

3. The process for preparing a graft copolymer (B) as claimed in claim 1, composed of:
(B1): 40 to 85% by weight, based on the solids content of the graft copolymer (B), of an agglomerated graft core (B1), composed of a graft core (B1a), wherein (B1) is obtained by
(a) polymerizing:
(B11): 0 to 21% by weight, based on the graft core (B1a), of styrene, and
(B12): 79 to 100% by weight, based on the graft core (B1a), butadiene,
wherein (B11) and (B12) add up to 100% by weight, and
(b) agglomeration of the graft core (B1a) obtained in (a) by adding 0.01 to 5 parts by weight, based on 100 parts by weight of the graft core (B1a), based in each case on the solids content, of at least one copolymer (C) having an agglomerating effect, to obtain (B1), wherein (C) is composed of:
(C1): 80 to 99.9% by weight of one or more hydrophobic $C_1$- to $C_4$-alkyl acrylates or $C_1$- to $C_4$-alkyl methacrylates and
(C2): 0.1 to 20% by weight of one or more hydrophilic comonomers selected from the group consisting of acrylamide, methylacrylamide, ethylacrylamide and n-butylacrylamide, wherein (C1) and (C2) add up to 100% by weight;
- (B2): 15 to 60% by weight, based on the solids content of the graft copolymer (B), of a graft shell composed of at least one ethylenically unsaturated monomer (B20), wherein (B20) comprises a mixture of the monomers (B21) and (B22), obtained by reacting the agglomerated graft core (B1) with a mixture of:
- (B21) 70 to 90% by weight styrene, based on the graft shell (B2), and
- (B22) 10 to 30% by weight, based on the graft shell (B2), acrylonitrile, methyl methacrylate, or mixtures of acrylonitrile and methyl methacrylate wherein the sum total of graft core (B1) and graft shell (B2) adds up to 100% by weight, wherein the copolymer (C) having an agglomerating effect is obtained by i) polymerizing (C1): 80 to 99.9% by weight of one or more hydrophobic $C_1$- to $C_4$-alkyl acrylates or $C_1$- to $C_4$-alkyl methacrylates, ii) adding at least one emulsifier (E), iii) adding and polymerizing (C2): 0.1 to 20% by weight of one or more hydrophilic comonomers selected from the group consisting of acrylamide, methylacrylamide, ethylacrylamide and n-butylacrylamide, wherein (C1) and (C2) add up to 100% by weight, wherein the addition of (C2) is carried out 2 to 100 min after the addition of (E) in step ii).

4. The process for preparing a graft copolymer as claimed in claim 1, wherein the copolymer (C) having an agglomerating effect has a core-shell structure, wherein the core consists of monomers (C1), and wherein the shell consists of 85 to 99.9% by weight of monomers (C1) and 0.1 to 15% by weight of monomers (C2), wherein (C1) and (C2) in the shell add up to 100% by weight.

5. The process for preparing a graft copolymer as claimed in claim 1, wherein the core of the copolymer (C) accounts for 3-20% by weight and the shell accounts for 80-97% by weight of the copolymer (C) having an agglomerating effect, wherein the total weight of core and shell adds up to 100%.

6. The process for preparing a graft copolymer as claimed in claim 1, wherein in step iii) the addition of (C2) is carried out 2 min after the addition of (E) in step ii) and lasts 20 min.

7. The process for preparing a graft copolymer as claimed in claim 1, wherein the addition of the at least one emulsifier (E) and (C2) terminates simultaneously.

8. The process for preparing a graft copolymer as claimed in claim 1, further comprising the addition of an initiator required for the polymerization of (C2) to step iii), wherein the addition of the at least one emulsifier (E), (C2) and the initiator required for the polymerization of (C2) terminates simultaneously.

9. The process for preparing a graft copolymer as claimed in claim 1, wherein the graft core (B1a) obtained in step (a) is agglomerated with at least one copolymer (C) having an agglomerating effect by adding 2.0 to 3.0 parts by weight, based on 100 parts by weight of the graft core (B1a), based in each case on the solids content.

10. The graft copolymer (B) obtained by a process as claimed in claim 1.

* * * * *